US011666048B2

(12) United States Patent
Lefiles et al.

(10) Patent No.: US 11,666,048 B2
(45) Date of Patent: Jun. 6, 2023

(54) TREATMENT FOR PLANTS IN CONJUNCTION WITH HARVESTING

(71) Applicant: CORBET SCIENTIFIC, LLC, Briarcliff Manor, NY (US)

(72) Inventors: James Holt Lefiles, Valdosta, GA (US); Bill Davis, Rye, NY (US)

(73) Assignee: CORBET SCIENTIFIC, LLC, Jackson, WY (US)

(*) Notice: Subject to any disclaimer, the term of this patent is extended or adjusted under 35 U.S.C. 154(b) by 322 days.

(21) Appl. No.: 16/480,250

(22) PCT Filed: Feb. 19, 2018

(86) PCT No.: PCT/US2018/018628
§ 371 (c)(1),
(2) Date: Jul. 23, 2019

(87) PCT Pub. No.: WO2018/156457
PCT Pub. Date: Aug. 30, 2018

(65) Prior Publication Data
US 2019/0364887 A1 Dec. 5, 2019

Related U.S. Application Data

(60) Provisional application No. 62/463,277, filed on Feb. 24, 2017.

(51) Int. Cl.
*A01N 25/10* (2006.01)
*A23B 7/153* (2006.01)
*A23B 7/16* (2006.01)
*C05B 7/00* (2006.01)
*C05G 3/60* (2020.01)
*C05G 3/70* (2020.01)
*C05G 5/23* (2020.01)
*C05G 3/50* (2020.01)

(52) U.S. Cl.
CPC ............. *A01N 25/10* (2013.01); *A23B 7/153* (2013.01); *A23B 7/16* (2013.01); *C05B 7/00* (2013.01); *C05G 3/50* (2020.02); *C05G 3/60* (2020.02); *C05G 3/70* (2020.02); *C05G 5/23* (2020.02); *A23V 2002/00* (2013.01)

(58) Field of Classification Search
None
See application file for complete search history.

(56) References Cited

U.S. PATENT DOCUMENTS

| 3,698,133 | A | 10/1972 | Schreiber |
|---|---|---|---|
| 3,947,996 | A | 4/1976 | Watts |
| 4,249,343 | A | 2/1981 | Dannelly |
| 4,301,620 | A | 11/1981 | Koslow et al. |
| 4,783,342 | A | 11/1988 | Polovina |
| 5,093,198 | A | 3/1992 | Speaker et al. |
| 5,405,425 | A | 4/1995 | Pieh et al. |
| 5,627,132 | A | 5/1997 | Lebeau |
| 5,649,495 | A | 7/1997 | Salestrom |
| 5,868,087 | A | 2/1999 | Salestrom |
| 5,888,597 | A | 3/1999 | Frey et al. |
| 6,077,605 | A | 6/2000 | McGowan et al. |
| 6,130,304 | A | 10/2000 | Sumiya et al. |
| 6,162,475 | A | 12/2000 | Hagenmaier et al. |
| 6,851,219 | B2 | 2/2005 | Kosta et al. |
| 6,905,711 | B1 | 6/2005 | Tullo et al. |
| 6,948,276 | B2 | 9/2005 | Petrea et al. |
| 7,160,580 | B2 | 1/2007 | Hettiarachchy et al. |
| 7,222,455 | B2 | 5/2007 | Schrader |
| 7,306,406 | B2 | 12/2007 | Putnam et al. |
| 7,399,730 | B2 | 7/2008 | Kostka et al. |
| 7,503,143 | B2 | 3/2009 | Krysiak et al. |
| 7,541,386 | B2 | 6/2009 | Kostka et al. |
| 7,749,332 | B2 | 7/2010 | Jonke et al. |
| 7,758,888 | B2 | 7/2010 | Lapidot et al. |

(Continued)

FOREIGN PATENT DOCUMENTS

| CN | 102127456 A | 7/2011 |
|---|---|---|
| CN | 102696665 A | 10/2012 |

(Continued)

OTHER PUBLICATIONS

First Office Action in Panama Application No. 92652, dated Jun. 4, 2021 (English Translation).
First Notice of Reasons for Rejection in Japan Application No. 2019-544784, dated Aug. 2, 2021 (English Translation).
First Examination Report in Australia Application No. 2017355326, dated Jul. 20, 2021.
First Office Action in U.S. Appl. No. 16/346,931, dated Jun. 22, 2021.
First Office Action in Costa Rica Application No. 2019-0216, dated Oct. 4, 2021 (English Translation).
Hearing Notice in Indian Application No. 201917020765, dated Aug. 8, 2021.
Second Office Action in Colombia Application No. NC2019/0004543, dated Sep. 3, 2021 (English Translation).
Second Office Action in China Patent Application No. 201780068164. X, dated Oct. 11, 2021 (English Translation).
Shay, G., "Alkali-Swellable and Alkali-Soluble Thickener Technology A Review," Polymers in Aqueous Media, Chapter 25, pp. 457-494 (1989).

(Continued)

Primary Examiner — Alton N Pryor
(74) Attorney, Agent, or Firm — Troutman Pepper Hamilton Sanders LLP (Rochester)

(57) ABSTRACT

The present invention is directed to methods of treating a plant having a plant part. One method involves providing a plant having a plant part; applying an aqueous treatment formulation to the plant, where the aqueous treatment formulation comprises a thickener, a water soluble divalent salt, a foam control agent, a complexing agent, a film forming agent, and water; and harvesting the plant part, where the aqueous treatment formulation, when applied to a surface of a plant, creates a water fast film on the surface that permits permeation of an aqueous material to the plant while minimizing loss of moisture or loss of a plant treatment chemical from the plant as compared to when the composition is not applied to the surface of the plant. The present invention also relates to a methods of treating a harvested plant part and to the treated harvested plant parts.

61 Claims, 4 Drawing Sheets

(56) References Cited

U.S. PATENT DOCUMENTS

| | | |
|---|---|---|
| 7,874,101 B2 | 1/2011 | Krysiak et al. |
| 7,951,853 B2 | 5/2011 | Ismail et al. |
| 7,972,084 B2 | 7/2011 | Bassett |
| 7,988,992 B2 | 8/2011 | Omidian et al. |
| 8,752,328 B2 | 6/2014 | Kaiser et al. |
| 8,765,160 B2 | 7/2014 | Guyon et al. |
| 8,784,681 B2 | 7/2014 | Chen et al. |
| 8,895,686 B2 | 11/2014 | Chen et al. |
| 9,096,793 B2 | 8/2015 | Cristobal et al. |
| 9,115,307 B2 | 8/2015 | Birthisel et al. |
| 9,238,774 B2 | 1/2016 | Carlson et al. |
| 9,309,462 B1 | 4/2016 | Curtis et al. |
| 9,426,948 B2 | 8/2016 | Pullen et al. |
| 9,476,175 B2 | 10/2016 | Chen et al. |
| 9,487,502 B2 | 11/2016 | Phadte et al. |
| 9,686,979 B2 | 6/2017 | Norton et al. |
| 11,457,624 B2 | 10/2022 | Lefiles et al. |
| 2002/0042346 A1 | 4/2002 | Hamersky et al. |
| 2004/0053788 A1 | 3/2004 | Hayashi et al. |
| 2004/0166183 A1 | 8/2004 | Ruseler-Van Embden et al. |
| 2004/0192555 A1 | 9/2004 | Hawk et al. |
| 2005/0113255 A1 | 5/2005 | Schrader et al. |
| 2006/0110413 A1 | 5/2006 | Lintner |
| 2007/0037711 A1 | 2/2007 | Pluta et al. |
| 2007/0166440 A1 | 7/2007 | Davie et al. |
| 2007/0190097 A1 | 8/2007 | Schrader |
| 2007/0295670 A1 | 12/2007 | Bassett |
| 2008/0107696 A1 | 5/2008 | Czech et al. |
| 2008/0172937 A1 | 7/2008 | Palmer et al. |
| 2010/0024072 A1 | 1/2010 | Justmann et al. |
| 2010/0054072 A1 | 3/2010 | Stansfield |
| 2011/0105333 A1 | 5/2011 | Israels et al. |
| 2011/0166022 A1 | 7/2011 | Israels et al. |
| 2012/0042420 A1* | 2/2012 | Kaiser .................. A01N 3/00 106/617 |
| 2012/0157634 A1 | 6/2012 | Lopez Villanueva |
| 2012/0225783 A1 | 9/2012 | Harris |
| 2014/0080708 A1 | 3/2014 | Buyse et al. |
| 2014/0148339 A1* | 5/2014 | Smejkal .............. C07D 487/04 540/554 |
| 2014/0202557 A1 | 7/2014 | Bullin |
| 2015/0031539 A1 | 1/2015 | Schnabel et al. |
| 2015/0051076 A1 | 2/2015 | Schnabel et al. |
| 2015/0051077 A1 | 2/2015 | Schnabel et al. |
| 2015/0051078 A1 | 2/2015 | Schnabel et al. |
| 2015/0056259 A1 | 2/2015 | Sharma et al. |
| 2015/0113873 A1 | 4/2015 | Balastre et al. |
| 2015/0359221 A1 | 12/2015 | Li et al. |
| 2015/0366186 A1 | 12/2015 | Li et al. |
| 2016/0244562 A1 | 8/2016 | Lindner |
| 2016/0262375 A1 | 9/2016 | Raman et al. |
| 2016/0316759 A1 | 11/2016 | Bougoure et al. |
| 2017/0006859 A1 | 1/2017 | Raman et al. |
| 2020/0253197 A1 | 8/2020 | Lefiles et al. |
| 2023/0043271 A1 | 2/2023 | Lefiles et al. |

FOREIGN PATENT DOCUMENTS

| | | |
|---|---|---|
| CN | 103857661 A | 6/2014 |
| CN | 104261988 B | 1/2015 |
| CN | 104478624 B | 4/2015 |
| CN | 105638715 A | 6/2016 |
| CN | 105694898 A | 6/2016 |
| CN | 106035349 A | 10/2016 |
| CN | 104478624 B | 7/2017 |
| EP | 2601834 A2 | 6/2013 |
| EP | 1771531 B1 | 5/2014 |
| HU | 197168 B | 3/1989 |
| JP | S56-133202 A | 10/1981 |
| JP | 3754755 B2 | 3/2006 |
| PL | 154145 B1 | 1/1990 |
| WO | 97/33890 A1 | 9/1997 |
| WO | 00/07938 A1 | 2/2000 |
| WO | 2000/027904 A1 | 5/2000 |
| WO | 2006/124606 A2 | 11/2006 |
| WO | 2007/059107 A2 | 5/2007 |
| WO | 2010/043447 A2 | 4/2010 |
| WO | 2010/080891 A1 | 7/2010 |
| WO | 2010/100039 A2 | 9/2010 |
| WO | 2010/144243 A1 | 12/2010 |
| WO | 2012/022046 A1 | 2/2012 |
| WO | 2014/033159 A1 | 3/2014 |
| WO | 2014/056780 A1 | 4/2014 |
| WO | 2014/086747 A2 | 6/2014 |
| WO | 2015/015087 A1 | 2/2015 |
| WO | 2015065805 A1 | 5/2015 |
| WO | 2015/127051 A1 | 8/2015 |
| WO | 2015/129729 A1 | 9/2015 |
| WO | 2016/193073 A1 | 12/2016 |
| WO | 2018/085106 A1 | 5/2018 |
| WO | 2019/210403 A1 | 11/2019 |

OTHER PUBLICATIONS

Maitra & Shulka, "Cross-Linking in Hydrogels—A Review," American Journal of Polymer Science 4(2): 25-31 (2014).

Richey, W.D., "Chelating Agents—A Review," Studies in Conservation 20(sup1): 229-234 (1975).

Sojka et al. (2002) Irrigation: An historical perspective. In: Lal, R., (ed.) Encyclopedia of Soil Science (1st Edition), pp. 745-749. Marcel Dekker, Inc., New York.

"Agriculture at a Crossroads: Finding and Recommendations for Future Farming" accessed at: https://www.globalagriculture.org/report-topics/water.html (accessed on Nov. 22, 2021).

Schlosser et al., "The Future of Global Water Stress: An Integrated Assessment" MIT Joint Program on the Science and Policy of Global Change, Report No. 254, pp. 1-31 (2014).

Taylor & Zilberman, "The Diffusion of Process Innovation: The Case of Drip Irrigation in California," Selected Paper prepared for presentation at the 2015 Agricultural & Applied Economics Association and Western Agricultural Economics Association Annual Meeting, San Francisco, CA, Jul. 26-28, 2015.

Müller & Deurer, "Review of the Remediation Strategies for Soil Water Repellency," Agriculture, Ecosystems & Environment 144: 208-221 (2011).

Saha et al., "Superabsorbent Hydrogel (SAH) as a Soil Amendment for Drought Management: A Review," Soil & Tillage Research 204:104736 (2020).

Coates et al., "Water Demand: What Drives Consumption?" In Managing Water under Uncertainty and Risk, The United Nations World Water Development Report 4 (vol. 1), Chapter 2. UNESCO (2012).

"OECD Environmental Outlook to 2050: The Consequences of Inaction," Organisation for Economic Co-Operation and Development (2012).

Turral et al., "Climate Change, Water and Food Security," FAO Water Report 36. Food and Agriculture Organization of the United Nations (2011).

Usgs, "Irrigation Water Use" (Accessed at: https://www.usgs.gov/mission-areas/water-resources/science/irrigation-water-use?qf-science_center_objects=0#qt-science_center_objects on Nov. 22, 2021).

Office Action in Argentine Application No. P 17 01 03015 (dated Nov. 5, 2021).

Preliminary Office Action in Brazil National Application No. 1120190089535 (dated Oct. 29, 2021).

Official Communication in Eurasia Patent Application No. 201991104 (dated Dec. 8, 2021).

First Examination Report in Indian Application No. 201917020765, dated Dec. 9, 2020.

First Office Action in Colombia Application No. NC2019/0004543, dated Nov. 25, 2020 (English Translation).

Official Communication in Ukraine Patent Application No. a 2019 06012, dated Sep. 11, 2020.

Official Communication in Eurasia Patent Application No. 201991104, dated Aug. 28, 2020.

Supplementary European Search Report and Search Opinion in Europe Patent Application No. 17866707.7, dated Aug. 13, 2020.

(56) References Cited

OTHER PUBLICATIONS

First Office Action and Search Report in Chile Patent Application No. 201901210, dated Jul. 20, 2020.
First Office Action in China Patent Application No. 201780068164.X, dated Feb. 20, 2021 (English Translation).
First Examination Report in Israel Application No. 266367, dated Mar. 16, 2021 (English Translation).
First Office Action in El Salvador Application No. 2019005881, examined Apr. 27, 2020 (English Translation).
Second Office Action and Search Report in Chile Patent Application No. 201901210, dated Apr. 19, 2021 (English Translation).
PCT International Search Report and Written Opinion for PCT/US2017/058476, dated Jan. 18, 2018.
Velickova et al., "Impact of Chitosan-Beeswax Edible Coatings on the Quality of Fresh Strawberries (Fragaria Ananassa cv Camarosa) Under Commercial Storage Conditions," Food Science and Technology 52(2):80-92 (2013).
PCT International Search Report and Written Opinion for PCT/US2018/018628, dated Apr. 23, 2018.
Official Communication in Eurasia Patent Application No. 201991104, dated Oct. 10, 2022.
Office Action in EP Application No. 17866707.7 (dated Oct. 21, 2022).
Office Action in Indonesia Application No. P00201903748 (dated Jul. 15, 2022).
Office Action in New Zealand Application No. 752848 (dated Sep. 9, 2022).
Office Action in Peru Application No. 920-2019 (dated Nov. 4, 2022).
Third Office Action and Search Report in Chile Patent Application No. 201901210, dated Aug. 8, 2022 (English Translation).
Office Action in U.S. Appl. No. 16/346,931, dated Mar. 1, 2022.
Third Office Action in China Patent Application No. 201780068164.X, dated Feb. 18, 2022).
Office Action in Vietnam Application No. 1-2019-02727 (dated Mar. 30, 2022).
Official Communication in Eurasia Patent Application No. 201991104 (dated Jun. 24, 2022).
Notice of Reasons for Rejection in Japan Application No. 2019-544784, dated Jun. 20, 2022.
Rejection Decision for CN 201780068164.X, dated Aug. 18, 2022 (with machine translation).
Hearing Notice in Indian Application No. 201917020765, dated Aug. 31, 2022.
Office Action in Mexico Application No. Mx/a/2019/005038 (dated Nov. 15, 2022).
Office Action and Search Report in Canadian Application No. 3041314 (dated Dec. 14, 2022).
Office Action in Mexico Application No. Mx/a/2019/005038 (dated Nov. 15, 2022) (Machine Translation).
Fourth Office Action in China Patent Application No. 201780068164.X, dated Jan. 19, 2023).
Office Action in Honduras Application No. 2019001173 (dated Feb. 1, 2023).
First Office Action in China Patent Application No. 201780068164.X, dated Jan. 19, 2023.

\* cited by examiner

106 Days, no treatment

106 Days, treated with an aqueous treatment formulation applied in the grove

TREATMENT FOR PLANTS IN CONJUNCTION WITH HARVESTING

This application is a national stage application under 35 U.S.C. § 371 of PCT International Application Serial No. PCT/US2018/018628, filed Feb. 19, 2018, which claims the priority benefit of U.S. Provisional Patent Application Ser. No. 62/463,277, filed Feb. 24, 2017, which are hereby incorporated by reference in their entirety.

FIELD OF THE INVENTION

The present application relates to treatments for plants in conjunction with harvesting.

BACKGROUND OF THE INVENTION

Agricultural agents, such as insecticides, fungicides, herbicides, miticides, and plant growth regulators, are often applied to a plant in the form of a liquid composition. To aid in the distribution or dispersal of the agricultural agent, such liquid compositions typically include one or more adjuvant compounds intended to improve one or more properties of the liquid composition.

Adjuvants can augment the physical properties of the liquid composition leading to a final product having increased storage stability, ease of handling, or improved efficacy. Adjuvants, when used with the active agricultural ingredient formulation, are designed to increase efficacy of the agricultural product or to improve the application characteristics of the pesticide. Thus, adjuvants have been designed to improve the "wetting" of drops during spraying, to alter the volatility of the spray mixture, to improve the rain-fastness of the herbicide on the plant, to improve the penetration or distribution of the active ingredient, to regulate the pH of the spray mix, to improve compatibility of the various components in a mix tank, and to reduce drift during spraying. Since the adjuvant acts in some manner to improve the effectiveness of the active ingredient, the amount of active ingredient needed to be effective can be reduced in many cases, without a loss in efficacy.

However, depending on the type of agricultural ingredient used, different adjuvants will have different effects on the ability of the agricultural ingredient to efficiently treat the plant. What is needed is an adjuvant that allows for improved agricultural ingredient dispersal on a plant surface, and provides an improved covering to the plant that promotes the distribution of the agricultural ingredient. Furthermore, what is needed in the art is a composition that contains an adjuvant and an active ingredient that, when applied to the surface of a plant, improves the efficacy of the active ingredient.

With few exceptions, most packing houses whether fruit or vegetable, are equipped with some basic machinery to wash, grade, apply protective coatings, size, pack, and ship product. While the same machinery may be different with respect to size and shape, the basic function remains the same regardless of the type of fruit or vegetable that is being processed.

As fruits and/or vegetables are harvested and processed, the respiration rate in these products increases rapidly. As the respiration rate increases, the potential for "water loss" rises along with it. As most physiological disorders that affect fruit and vegetables tend to be related to water, good water management becomes of critical importance. Even small changes in relative humidity can significantly affect the rate of water loss. The rate of water loss during the first few days after harvest and packing is generally much higher than during the rest of the "storage" period. This is one example of "front-end" shelf life destruction (i.e., destruction initiated during the harvest and packing), is much more damaging than back-end shelf life destruction (i.e., destruction caused by waiting too long to put packaged goods in cool storage or improper shipping practices).

An interesting finding not yet taken full advantage of commercially is the use of pre-harvest and post-harvest anti-transparent sprays.

The present invention is directed to overcoming the above-noted deficiencies in the art.

SUMMARY OF THE INVENTION

One aspect of the present invention is directed to a method of treating a plant. This method involves providing a plant having a plant part and applying an aqueous treatment formulation to the plant, where the aqueous treatment formulation comprises a thickener, a water soluble divalent salt, a foam control agent, a complexing agent, a film forming agent, and water. The method further involves harvesting the plant part after said applying, where the aqueous treatment formulation, when applied to a surface of a plant, creates a water fast film on the surface that permits permeation of an aqueous material to the plant while minimizing loss of moisture or loss of a plant treatment chemical from the plant as compared to when the composition is not applied to the surface of the plant.

A further aspect of the present invention relates to a method of treating a harvested plant part. This method involves providing a harvested plant part and applying an aqueous treatment formulation to the harvested plant part, where the aqueous treatment formulation comprises a thickener, a water soluble divalent salt, a foam control agent, a complexing agent, a film forming agent, and water, and where the aqueous treatment formulation, when applied to a surface of a harvested plant part, creates a water fast film on the surface that permits permeation of an aqueous material to the harvested plant part while minimizing loss of moisture or loss of a plant treatment chemical from the harvested plant part as compared to when the aqueous treatment formulation is not applied to the surface of the harvested plant part.

Another aspect of the present invention relates to a method of treating a plant. This method involves providing a plant having a plant part and applying an aqueous treatment formulation to the plant, where the aqueous treatment formulation creates a coating on the plant upon drying of the aqueous treatment formulation. The method further involves harvesting the plant part after said applying, where the aqueous treatment formulation, when applied to a surface of a plant, creates a water fast film on the surface that permits permeation of an aqueous material to the plant while minimizing loss of moisture or loss of a plant treatment chemical from the plant as compared to when the composition is not applied to the surface of the plant.

Yet another aspect of the present invention relates to a method of treating a harvested plant part. This method involves providing a harvested plant part and applying an aqueous treatment formulation to the harvested plant part, where the aqueous treatment formulation creates a coating on the harvested plant part upon drying of the aqueous treatment formulation, and where the aqueous treatment formulation, when applied to a surface of a harvested plant part, creates a water fast film on the surface that permits permeation of an aqueous material to the harvested plant part while minimizing loss of moisture or loss of a plant treatment chemical from the harvested plant part as compared to when the aqueous treatment formulation is not applied to the surface of the harvested plant part.

The present invention also relates to the harvested plant parts of the methods of the present application.

The methods of the present invention provide improved plant treatment chemical efficiency by: (i) increasing spray efficiency; (ii) improving chemical and nutritional effectiveness; (iii) reducing spray program cost; (iv) retaining moisture more efficiently; (v) enabling plant treatment chemicals to remain on longer periods of time by reducing runoff and waste; (vi) providing freeze protection by lowering the threshold at which freeze damage occurs; and (vii) providing long lasting adhesion.

The methods of the present invention improve the efficiency of chemical usage by maximizing the effectiveness of pesticides, allowing the use of lower labeled rates. While not wishing to be bound by theory, the methods of the present invention also provide anti-transpiration and wetting agent properties to attract and retain moisture, thereby reducing the demand on water supplies and increasing the retention rate of the water applied. Application of the aqueous treatment formulation of the present invention to a plant leaf provides a "wax-like" coating that shields the plant from the environment, which by its very chemical nature loves water. The "pH balancing" properties of the aqueous treatment formulation of the present invention thicken this coating, allowing more room to draw moisture into itself. In other words, the aqueous treatment formulation traps moisture every time it comes into contact with humidity, dew, rain, or irrigation.

The present invention relates to the use of an innovative water repositioning aqueous treatment formulation, which serves to limit transpiration (i.e., water loss) in the harvested part. As this is moisture that would have otherwise evaporated into the air, the "moisture management" feature of the aqueous plant treatment formulation to the present invention saves and re-uses water. When applied to fruits and vegetables both pre-harvest and during in-house packing, this moisture management system is unequalled in its ability to help harvested plant parts resist "front-end" shelf-life destruction by reducing shrinkage, softening, and susceptibility to decay.

The aqueous treatment formulation is compatible with most, if not all, waxes and protective solutions used in fruit and vegetable packing. In addition to protecting against water loss, the methods of the claimed invention enhance all fungicides that may be mixed-in with the wax, virtually ensuring a longer post-harvest shelf-life.

Fresh fruits and vegetables have a wonderful capacity to respond to proper care and handling. During both the production and post-harvest stages, it is the "moisture management" quality of the aqueous plant treatment formulation that provides protection against fungus, bacteria, and water loss.

BRIEF DESCRIPTION OF THE DRAWINGS

FIG. 3B shows untreated harvested fruit. FIG. 3C shows harvested fruit treated in the grove with an aqueous treatment formulation comprising 95.70 wt % water, 2.00 wt % ACUSOL® 823, 0.10 wt % PVA (100,000 MW), 0.10 wt % $ZnSO_4$ monohydrate, 0.10 wt % Antifoam® 8810, and 2.00 wt % TEA on Day 0 (FIG. 3B). Fruit was packed and stored for 106 days.

DETAILED DESCRIPTION OF THE INVENTION

Figure 1A:
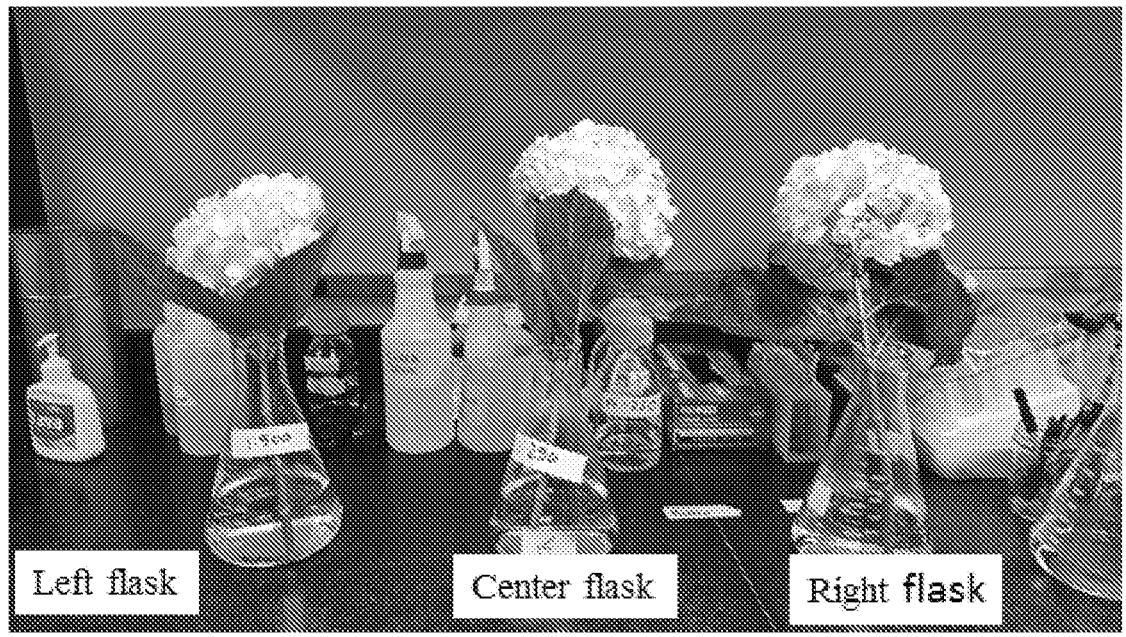
FIGS. 1A-1B show images of harvested *Hydrangea* stems on Day 0 (FIG. 1A) and Day 5 (FIG. 1B). Harvested stems were spray treated using the standard rate of application of the aqueous treatment formulation of the present application (FIGS. 1A-1B, left flask) or twice the standard rate of the aqueous treatment formulation of the present application (FIGS. 1A-1B, center flask). For treatment at the standard rate, plants were spray treated with an aqueous treatment formulation of the present application comprising 95.70 wt % water, 2.00 wt % ACUSOL® 823, 0.10 wt % PVA (100,000 MW), 0.10 wt % $ZnSO_4$ monohydrate, 0.10 wt % Antifoam® 8810, and 2.00 wt % TEA. Untreated *Hydrangea* stems were used as a control (FIGS. 1A-1B, right flask).

One aspect of the present invention is directed to a method of treating a plant. This method involves providing a plant having a plant part and applying an aqueous treatment formulation to the plant, where the aqueous treatment formulation comprises a thickener, a water soluble divalent salt, a foam control agent, a complexing agent, a film forming agent, and water. The method further involves harvesting the plant part after said applying, where the aqueous treatment formulation, when applied to a surface of a plant, creates a water fast film on the surface that permits permeation of an aqueous material to the plant while minimizing loss of moisture or loss of a plant treatment chemical from the plant as compared to when the composition is not applied to the surface of the plant.

As used herein, the term "plant" refers to any living organism belonging to the kingdom Plantae, including, but not limited to, trees, herbs, bushes, grasses, and vines. The term refers to both monocots and dicots. Exemplary plants include, but are not limited to, corn, potatoes, roses, apple trees, sunflowers, wheat, rice, bananas, tomatoes, pumpkins, squash, lettuce, cabbage, oak trees, guzmania, geraniums, hibiscus, *clematis*, poinsettias, sugarcane, taro, duck weed, pine trees, Kentucky blue grass, *zoysia*, coconut trees, *brassica* leafy vegetables (e.g., broccoli, broccoli raab, Brussels sprouts, cabbage, Chinese cabbage (e.g., Bok Choy and Napa), cauliflower, cavalo, collards, kale, kohlrabi, mustard greens, rape greens, and other *brassica* leafy vegetable crops), bulb vegetables (e.g., garlic, leek, onion (dry bulb, green, and Welch), shallot, and other bulb vegetable crops), citrus fruits (e.g., grapefruit, lemon, lime, orange, tangerine, citrus hybrids, pummelo, and other citrus fruit crops), cucurbit vegetables (e.g., cucumber, citron melon, edible gourds, gherkin, muskmelons (including hybrids and/or cultivars of *cucumis* melons), water-melon, cantaloupe, and other cucurbit vegetable crops), fruiting vegetables (including eggplant, ground cherry, pepino, pepper, tomato, tomatillo, and other fruiting vegetable crops), grape, leafy vegetables (e.g., romaine), root/tuber and corm vegetables (e.g., potato), and tree nuts (e.g., almond, pecan, pistachio, and walnut), berries (e.g., tomatoes, barberries, currants, elderberryies, gooseberries, honeysuckles, mayapples, nannyberries, Oregon-grapes, see-buckthorns, hackberries, bearberries, lingonberries, strawberries, sea grapes, lackberries, cloudberries, loganberries, raspberries, salmonberries, thimbleberries, and wineberries), cereal crops (e.g., corn, rice, wheat, barley, sorghum, millets, oats, ryes, triticales, buckwheats, fonio, and *quinoa*), pome fruit (e.g., apples, pears), stone fruits (e.g., coffees, jujubes, mangos, olives, coconuts, oil palms, pistachios, almonds, apricots, cherries, damsons, nectarines, peaches and plums), vines (e.g., table grapes and wine grapes), fibber crops (e.g. hemp and cotton), ornamentals, and the like.

As used herein, the term "growing plant" refers to a plant that is increasing in mass or cell number. Plants may be grown by any means known in the art, including in soil, in water culture (e.g., hydroponically), in media, in sand culture, in gravel culture, and in adsorbed-nutrient culture (see, e.g., McCall W W, Nakagawa Y. 1970. Growing plants without soil. Honolulu (HI): University of Hawaii. 22 p. (Circular; 440), which is hereby incorporated by reference in its entirety). In one embodiment, the plant is a growing plant.

As used herein, the term "mature plant" refers to a plant in which normal development of all vegetative and reproductive organs has occurred. In one embodiment, the plant is a mature plant.

As used herein, the term "flowering plant" refers to a plant which produces flowers. In one embodiment, the plant is a flowering plant. The flowering plant may be an ornamental horticultural plant or an ornamental flowering plant. The flowering plant may be an angiosperm or a gymnosperm.

In one embodiment, the flowering plant is selected from the group consisting of *Arabidopsis thaliana*, African violet, alstromeria, anemone, aster, azalea, *begonia*, bellflower, *bougainvillea*, buttercup, cactus, *camellia*, carnation, *chrysanthemum, clematis*, cockscomb, columbine, cosmos, cyclamen, daffodil, dahlia, daisy, false cypress, forsythia, freesia, *gardenia, gladioli*, hibiscus, hollyhock, *hydrangea*, iris, lilac, lily, mum, peony, *pelargonium, petunia*, poinsettia, poppy, rose, saintpaulia, snapdragon, statice, sunflower, tulip, orchid, waxflower, and *zinnia*.

The plant part may be an edible plant part. In accordance with this embodiment, the edible plant part is selected from the group consisting of alfalfa, apple, apricot, asparagus, avocado, banana, blueberry, barley, basil, bean, beet, broccoli, brussel sprout, cabbage, canola, carrot, cauliflower, celery, chicory, chives, citrus, corn, coriander, cucumber, dill, eggplant, endive, garlic, grape, grapefruit, kiwi, lavender, leek, lettuce, mango, melon, mint, nectarine, oregano, orange, onion, *papaya*, parsley, parsnip, pea, peach, peanut, pear, pepper, pineapple, potato, pumpkin, radish, raspberry, rice, rosemary, rye, sweet potato, sorghum, soybean, spinach, strawberry, squash, sunflower, thyme, turnip, tomato, wheat, yam, and zucchini.

The plant part may be selected from the group consisting of a flower, a fruit, a vegetable, and a herb.

In one embodiment, the plant part is a flower. The flower may be selected from the group consisting of *Arabidopsis thaliana*, African violet, alstromeria, anemone, aster, azalea, *begonia*, bellflower, *bougainvillea*, buttercup, cactus, *camellia*, carnation, *chrysanthemum, clematis*, cockscomb, columbine, cosmos, cyclamen, daffodil, dahlia, daisy, false cypress, forsythia, freesia, *gardenia, gladioli*, hibiscus, hollyhock, *hydrangea*, iris, lilac, lily, mum, peony, *pelargonium, petunia*, poinsettia, poppy, rose, saintpaulia, snapdragon, statice, sunflower, tulip, orchid, waxflower, and *zinnia*.

Alternatively, the plant part is a fruit. The fruit may be selected from the group consisting of alfalfa, apple, apricot, avocado, banana, blueberry, barley, bean, corn, cucumber, eggplant, grape, grapefruit, kiwi, mango, melon, nectarine, orange, *papaya*, pea, peach, peanut, pear, pepper, pineapple, pumpkin, raspberry, rice, rye, sorghum, soybean, strawberry, squash, sunflower, turnip, tomato, wheat, and zucchini.

The plant part may be a vegetable. The vegetable may be selected from the group consisting of asparagus, beet, broccoli, brussel sprout, cabbage, carrot, cauliflower, celery, endive, garlic, leek, lettuce, parsnip, spinach, turnip, and yam.

The plant part may be a herb. The herb may be selected from the group consisting of basil, chicory, chives, coriander, dill, lavender, mint, parsley, rosemary, and thyme.

The plant part may be harvested within 48 hours, 24 hours, or 12 hours of applying the aqueous treatment formulation.

Methods of applying aqueous treatment formulations are well known in the art and include, but are not limited to, spraying, wetting, dipping, misting, drenching, showering, fogging, soaking, dampening, drizzling, dousing, and splashing (see, e.g., Matthews, G. A. (2000) Pesticide Application Methods, Third Edition, Blackwell Science Ltd, Oxford, UK, which is hereby incorporated by reference in its entirety).

In one embodiment, the aqueous treatment formulation is applied in a non-invasive manner so as to reduce and/or eliminate plant tissue damage. The method may further involve removing dead and dying tissue from the plant and the soil surface prior to harvest.

In some embodiments, the plant is harvested using cutting tools. Cutting tools are well known in the art and include, for example, a knife, a sheath, a pruner, a blade, a sheath, and shears. The cutting tools may be sanitized prior to harvesting.

Various thickeners are well known in the art and include, for example, associative and non-associative thickeners (see Gregory D. Shay, Chapter 25, "Alkali-Swellable and Alkali-Soluble Thickener Technology A Review", Polymers in Aqueous Media—Performance Through Association, Advances in Chemistry Series 223, J. Edward Glass (ed.), ACS, pp. 457-494, Division Polymeric Materials, Washington, D.C. (1989); Chassenieux et al., "Rheology of Associative Polymer Solutions," *Current Opinion in Colloid & Interface Science* 16(1):18-26 (2011); Winnik et al., "Associative Polymers in Aqueous Solution," *Current Opinion in Colloid & Interface Science* 2(4):424-36 (1997); and Antunes et al., "Gelation of Charged Bio-Nanocompartments Induced by Associative and Non-Associative Polysaccharides," *Colloids Surf B Biointerfaces.* 66(1):134-40 (2008), which are hereby incorporated by reference in their entirety).

As used herein, the term "associative thickener" refers to a water soluble polymer containing hydrophobic groups that interact with each other and the other elements of the composition to create a three-dimensional network. Exemplary associative thickeners include hydrophobically-modified ethoxylated urethane rheology (HEUR) polymers, hydrophobically-modified alkali swellable emulsion (HASE) polymers, hydrophobically-modified polyether (HMPE), hydrophobically-modified hydroxy ethyl cellulose (HMHEC), and hydrophobically modified ethoxylated aminoplast (HEAT) polymers.

As used herein, the term "non-associative thickener" refers to a high molecular weight water soluble polymer containing hydrophobic groups that interact with each other to create a three-dimensional network. Suitable non-associative thickeners include alkali soluble emulsion (ASE) polymers and cellulose ethers.

In one embodiment, the thickener is an associative anionic thickener. Exemplary associative anionic thickeners are described in European Patent Publication EP2542598 A1 to Nguyen et al., which is hereby incorporated by reference in its entirety. In one example, the associative anionic thickener is selected from the group consisting of a hydrophobically-modified alkali swellable emulsion (HASE) polymer, an alkali soluble emulsion (ASE) polymer, and mixtures thereof.

Alternatively, the thickener is an associative nonionic thickener selected from the group consisting of hydrophobically-modified ethoxylated urethane rheology (HEUR) polymers, hydrophobically modified ethoxylated aminoplast (HEAT) polymers, and mixtures thereof.

In one embodiment, the thickener is selected from the group consisting of a hydrophobically-modified alkali soluble polymer, an alkali soluble emulsion polymer, a hydrophobically-modified ethoxylated urethane polymer, and mixtures thereof. Exemplary associative thickeners include, but are not limited to, ACUSOL® 801S, ACUSOL® 805S, ACUSOL® 810A, ACUSOL® 820, ACUSOL® 823, ACUSOL® 830, ACUSOL® 835, ACUSOL® 842, ACUSOL® 880, and ACUSOL® 882. ACUSOL is a trademark of Rohm and Hass Company, Philadelphia, Pa.

The water soluble divalent salt may be formed from a divalent cation selected from the group consisting of barium, calcium, chromium (II), cobalt (II), copper (II), iron (II), lead (II), magnesium, manganese (II), strontium, zinc (II), tin (II), and mixtures thereof. In one embodiment, the water soluble divalent salt is selected from the group consisting of zinc (II) acetate, zinc (II) bromide, zinc (II) chlorate, zinc (II) chloride, zinc (II) fluoride, zinc (II) formate, zinc (II) iodide, zinc (II) nitrate, zinc (II) sulfate monohydrate, zinc (II) sulfate heptahydrate, zinc (II) sulfate hexahydrate, zinc (II) sulfate anhydrous, and mixtures thereof. In another embodiment, the water soluble divalent salt is a zinc sulfate.

The foam control agent may be selected from the group consisting of alkyl poly acrylates, fatty acids, fatty alcohols, monoglycerides, diglycerides, triglycerides, a silicone-based foam control agent, and mixtures thereof.

Fatty acids or fatty alcohols are species which have from 10 to 20 carbon in their alkyl chain. Suitable fatty acids are saturated or unsaturated and can be obtained from natural sources (e.g., palm oil, coconut oil, babassu oil, safflower oil, tall oil, castor oil, tallow and fish oils, grease, and mixtures thereof) or can be synthetically prepared. Examples of suitable fatty acids for use in the present invention include capric acid, lauric acid, myristic acid, palmitic acid, stearic acid, arachidic acid, and behenic acid.

Fatty alcohols derived from the above-mentioned fatty acids are suitable for the foam control agents of the present invention. Exemplary fatty alcohols include, but are not limited to, capryl alcohol, lauryl alcohol, myristyl alcohol, palmitoleyl alcohol, stearyl alcohol, arachidyl alcohol, and behenyl alcohol.

As used herein, the term "glyceride" refers to esters where one, two, or three of the —OH groups of the glycerol have been esterified. Monoglycerides, diglycerides, and triglycerides may comprise esters of any of the fatty acids described above.

As used herein, the term "silicone-based foam control agent" refers to a polymer with a silicon backbone. In one embodiment, the foam control agent is a silicone-based foam control agent. Suitable silicone-based foam control agents include, but are not limited to, polydimethylsiloxane fluid and polydimethylsiloxane-treated silica.

As used herein, the term "complexing agent" refers to a substance that is capable of complexing metal ions. The complexing agent may be selected from the group consisting of diethylenetriaminepentaacetic acid ("DTPA"), ethylenedinitrilotetraacetic acid ("EDTA"), nitrilotriacetic acid ("NTA"), diethanolamine ("DEA"), triethanolamine ("TEA"), and mixtures thereof.

In one embodiment, the complexing agent is triethanolamine ("TEA"). In another embodiment, the complexing agent is a mixture of triethanolamine ("TEA") and diethanolamine ("DEA").

As used herein, the term "film forming agent" refers to an agent which functions to enhance film formation. Film forming agents may be selected from the group consisting of polyvinyl alcohol, polyvinyl acetate, and mixtures thereof. In one embodiment, the film forming agent is polyvinyl alcohol having a molecular weight of 25,000 to 175,000. Alternatively, the film forming agent is polyvinyl alcohol having a molecular weight of 80,000 to 150,000. For example, the film forming agent may be polyvinyl alcohol having a molecular weight of 100,000.

The aqueous treatment formulation may comprise 1.00 to 3.00 wt %, 1.00 to 2.50 wt %, 1.00 to 2.00 wt %, 1.50 to 2.00 wt %, or 1.50 to 2.50 wt % thickener; 0.05 to 0.10 wt %, 0.05 to 0.15 wt %, 0.05 to 0.50 wt %, 0.05 to 0.15 wt %, 0.10 to 0.40 wt %, 0.20 to 0.30 wt % water soluble divalent salt; 0.05 to 0.10 wt %, 0.05 to 0.15 wt %, 0.05 to 0.50 wt %, 0.05 to 0.15 wt %, 0.10 to 0.40 wt %, 0.15 to 0.35 wt %, 0.20 to 0.30 wt % foam control agent; 1.00 to 3.00 wt %, 1.00 to 2.50 wt %, 1.00 to 2.00 wt %, 1.50 to 2.00 wt %, or 1.50 to 2.50 wt % complexing agent; 0.05 to 0.10 wt %, 0.05 to 0.15 wt %, 0.05 to 0.50 wt %, 0.05 to 0.15 wt %, 0.10 to 0.40 wt %, or 0.20 to 0.30 wt % film forming agent; and 90 to 99 wt %, 92 to 99 wt %, 94 to 99 wt %, 96 to 99 wt %, 97 to 99 wt %, or 98 to 99 wt % water.

In one embodiment, the aqueous treatment formulation comprises 1.00 to 3.00 wt % of the thickener; 0.05 to 0.15 wt % of the water soluble divalent salt; 0.05 to 0.15 wt % of the foam control agent; 1.00 to 3.00 wt % of the complexing agent; 0.05 to 0.15 wt % of a film forming agent; and 90 to 99 wt % water.

In another embodiment, the aqueous treatment formulation comprises 1.60 to 2.40 wt % of the thickener; 0.08 to 0.12 wt % of the water soluble divalent salt; 0.08 to 0.12 wt % of the foam control agent; 1.60 to 2.40 wt % of the complexing agent; 0.08 to 0.12 wt % of a film forming agent; and 97.60 to 98.40 wt % water.

Alternatively, the aqueous treatment formulation comprises 1.80 to 2.20 wt % of the thickener; 0.09 to 0.11 wt % of the water soluble divalent salt; 0.09 to 0.11 wt % of the foam control agent; 1.80 to 2.20 wt % of the complexing agent; 0.09 to 0.11 wt % of a film forming agent; and 97.80 to 98.20 wt % water.

In one embodiment, the present invention relates to the harvested plant part of the plant treated with the aqueous treatment formulation of the present application.

In some embodiments, the methods of the present invention may further involve applying a plant treatment chemical to the plant or plant part. In accordance with these embodiments, the aqueous treatment formulation is an adjuvant. As used herein, the term "adjuvant" refers to a composition which, when used with a plant treatment chemical, increases the efficacy of the plant treatment chemical or improves the application characteristics of a plant treatment chemical formulation. In some embodiments, the aqueous treatment formulation reduces the amount of a plant treatment chemicals required to achieve a desired effect by at least 15 to 40 wt %, 20 to 35 wt %, or 20 to 30 wt %.

The plant treatment chemical may be selected from the group consisting of a pesticide and a growth regulating agent.

As used herein, the term "pesticide" refers to an agent that can be used to control and/or kill a pest or organism. Pesticides are well known in the art and include, for example, insecticides, intended for the control of insects; fungicides, intended for the control of fungi; miticides, intended for the control of mites; nematicides, intended for the control of nematodes; acaricides, intended for the control of arachnids or spiders; and virucides intended for the control of viruses. The plant treatment chemical may be a pesticide selected from the group consisting of an herbicide, an insecticide, a fungicide, a miticide, and a nematicide.

In one embodiment, the plant treatment chemical is a herbicide selected from the group consisting of acetyl-CoA carboxylase inhibitors (ACCase), actolactate synthase inhibitors (ALS), microtubule assembly inhibitors (MT), growth regulators (GR), photosynthesis II, binding site A inhibitors (PSII(A)), photosynthesis II, binding site B inhibitors (PSII(B)), photosynthesis II, binding site C inhibitors (PSII(C)), shoot inhibitors (SHT), enolpyruvyl-shikimate-phosphate synthase inhibitors (EPSP), glutamine synthase inhibitors (GS), phytoene desaturase synthase inhibitors (PDS), diterpene inhibitors (DITERP), protoporphyrinogen oxidase inhibitors (PPO), shoot and root inhibitors (SHT/RT), photosystem 1 electron diverters (ED), hydroxyphenlypyruvate dioxygenase synthesis inhibitors (HPPD), and combinations thereof.

Suitable herbicides include, but are not limited to, those listed in Table 1.

TABLE 1

Exemplary Herbicides

| Site of Action of Active Ingredient | Class of Active Ingredient | Common Name of Active Ingredient | Commercial Product |
|---|---|---|---|
| ACCase | Cyclohexene Oxime | Sethoxydim | Poast ® |
| ACCase | Phenoxy | Quizalofop-P | Assure ® II |
| ALS | Sulfonylurea | Primisulfuron | Beacon ® |
| ALS | Imidazolinone | Imazamox | Raptor ® |
| MT | Dinitroaniline | Trifluralin | Passport ® |
| MT | Dinitroanaline | Pendimethalin | Prowl ® |
| GR | Phenoxy | 2,4-D | Amsol ® |
| GR | Benzoic Acid | Dicamba | Banvel ® |
| PSII(A) | Triazine | Atrazine | Atrazine ® |
| PSII(A) | Triazine | Cynazine | Blandex ® |
| PSII(B) | Nitrite | Bromoxylin | Butracil ® |
| PSII(C) | Phenylurea | Diuron | Karmex ® |
| SHT | Thiocarbamate | EPTC | Eptam ® |
| EPSP | Organophosphorous | Glyphosate | Roundup ® |
| GS | Organophosphorous | Gluphosinate | Liberty ® |
| PDS | Pyridazinone | Norflurazon | Zorial ® |
| DITERP | unclassified | Clomazone | Command ® |
| PPO | Diphenyl ether | Fomesafen | Reflex ® |
| SHT/RT | Chloroacetanilide | Alachor | Lasso ® |
| SHT/RT | Chloroacetanilide | Acetochlor | Surpass ® |
| ED | Quaternary ammonium | Diquat | Reglone ® |
| HPPD | Cyclopropylisoxazole | Isoxaflutole | Balance ® |

In one embodiment, the plant treatment chemical is an insecticide selected from the group consisting of carbamates, organochlorines, nicotinoids, phosphoramidothioates, organophosphates, pyrethroids, and combinations thereof.

Suitable insecticides include, but are not limited to, those listed in Table 2.

TABLE 2

Exemplary Insecticides

| Class of Active Ingredient | Common Name of Active Ingredient | Commercial Product |
|---|---|---|
| Carbamate | Aldricarb | Temik ® |
| Organochlorine | Endosulfan | Thidan ® |
| Nicotinoid | Imidacloprid | Merit ® |
| Phosphoramidothioate | Acephate | Orthene ® |
| Organophosphate | Dimethoate | Roxion ® |
| Pyrethroid | Permethrin | Ambush ® |

The plant treatment chemical may be a fungicide selected from the group consisting of aliphatic nitrogens, benzimidazoles, dicarboximides, dithiocarbamates, imidazoles, strobins, anilides, aromatics, sulfur derivatives, copper derivatives, and combinations thereof.

Suitable fungicides include, but are not limited to, those listed in Table 3.

TABLE 3

Exemplary Fungicides

| Class of Active Ingredient | Common Name of Active Ingredient | Commercial Product |
|---|---|---|
| Aromatic | Chlorothalonil | Bravo ® |
| Copper | Copper hydroxide | Kocide ® |
| Sulfur | Flowers of Sulfur | Kumulus ® |
| Aliphatic nitrogen | Cymoxanil | Curzate ® |
| Benzimidazole | Thiabendazole | Thiabendazole ® |
| Dicarboximide | Capatan | Captan ® |
| Dicarboximide | Vinclozolin | Ronilan ® |
| Dicarboximide | Mancozeb | Dithane ® |
| Dicarboximide | Maneb | Manex ® |
| Dicarboximide | Meritram | Polyram ® |
| Dicarboximide | Thiram | Thiram ® |
| Dicarboximide | Ziram | Ziram ® |
| Imidazole, dicarboximide | Iprodione | Rovral ® |
| Organophosphate | Fosetyl-aluminum | Alientte ® |
| Dithiocarbamate | Mancozeb | Dithane ® |
| Strobin | Azoxystrobin | Abound ® |
| Anilide | Metalaxyl | Ridomil ® |

The plant treatment chemical may be a miticide selected from the group consisting of carbamates, carbazates, diphenyl oxazolines, glycides, macrocyclic compounds, METI-acaracides, napthoquinone derivatives, organochlorines, organophosphates, organotins, oils, pyrethroids, pyridazinone, pyrroles, soaps, sulfur, tetrazines, tetronic acids, and combinations thereof.

Suitable miticides include, but are not limited to, those listed in Table 4.

TABLE 4

Exemplary Miticides

| Class of Active Ingredient | Common Name of Active Ingredient | Commercial Product |
|---|---|---|
| Carbamate | Carbaryl | Sevin ® |
| Carbamate | Formetanate | Carzol ® |
| Carbamate | Hexythiazox | Savey ® |
| Carbazate | Bifenazate | Acrimite ® |
| Diphenyl oxazoline | Etoxazol | Tetrasan ® |
| Glycoside | Abamecitin | Avid ® |
| Macrocylic compound | Abamectin | Affirm ® |
| Macrocylic compound | Milbemectin | Milbeknock ® |

TABLE 4-continued

Exemplary Miticides

| Class of Active Ingredient | Common Name of Active Ingredient | Commercial Product |
|---|---|---|
| METI-acaracide | Fenpyroximate | Akari ® |
| METI-acaracide | Pyridaben | Sanmite ® |
| Napthoquinone derivative | Acequinocyl | Shuttle ®O |
| Organochlorine | Dicofol | Kethane ® |
| Organophosphate | Diazinon | Spectracide ® |
| Organophosphate | Dimethoate | Cygon ® |
| Organophosphate | Disulfoton | Di-Syston ® |
| Organotin | Fenbutatin oxide | Vendex ® |
| Oil | Clove oil | Pest Out ® |
| Oil | Cottonseed oil | Sea-cide ® OG |
| Oil | Garlic oil | Captiva ® |
| Oil | Mineral oil | Ultra-Pure ® Oil |
| Oil | Neem oil | Triact ® 70 |
| Oil | Peppermint oil | Ecotec ® |
| Oil | Petroleum oil | Biocover ® |
| Oil | Rosemary oil | Captiva ® |
| Oil | Soybean oil | Captiva ® |
| Pyrethroids | Bifenthrin | Talstar ® |
| Pyrethroids | Fenpropathrin | Danitol ® |
| Pyrethroids | Fluvalinate | Yardex ® |
| Pyrethroids | Lambda-Cyhalothrin | Scimitar ® GC |
| Pyridazinone | Pyridaben | Pyramite ® |
| Pyrroles | Chlorfenapyr | Pylon ® |
| Soaps | Potassium salts of fatty acids | Des-X ® |
| Sulfur | Sulfur | Micro Sulf ® |
| Tetrazine | Clofentezine | Apollo ® |
| Tetronic acid | Spiromesifen | Judo ® |
| Tetronic acid | Spirotetramat | Kontos ® |

The plant treatment chemical may be a nematicide selected from the group consisting of carbamates, organophosphates, halogenated hydrocarbons, methyl isothiocyanate liberators, and combinations thereof.

Suitable nematicides include, but are not limited to, those listed in Table 5.

TABLE 5

Exemplary Nematicides

| Class of Active Ingredient | Common Name of Active Ingredient | Commercial Product |
|---|---|---|
| Carbamate | Aldicarb | Temik ® |
| Carbamate | Aldoxycarb | Standak ® |
| Carbamate | Carbofuran | Furadan ® |
| Carbamate | Oxamyl | Vydate ® |
| Halogenated hydrocarbon | Chloropicrin | Telone ® II |
| Halogenated hydrocarbon | Methyl bromide | Meth-O-Gas ® |
| Methyl isothiocyanate liberator | Dazomet | Basamid ® G |
| Methyl isothiocyanate liberator | Metam sodium | Vapam ® HL |
| Organophosphate | Cadusaphos | Rugby ® |
| Organophosphate | Ethoprop | Mocap ® |
| Organophosphate | Fenamiphos | Nemacur ® |
| Organophosphate | Fensulfothion | Dasanit ® |
| Organophosphate | Terbufos | Plydox ® |

In an additional embodiment, the plant treatment chemical is a growth regulating agent selected from the group consisting of auxins, cytokinins, defoliants, ethylene releasers, gibberellins, growth inhibitors, growth retardants, growth stimulators, and combinations thereof.

Suitable growth regulators include, but are not limited to, those listed in Table 6.

TABLE 6

Exemplary Growth Regulators

| Class of Active Ingredient | Common Name of Active Ingredient | Commercial Product |
|---|---|---|
| Cytokinin | Zeatin | |
| Defoliant | Thidiazuron (ISO) | Dropp ® |
| Growth stimulator | Forchlorfenuron | |
| Growth inhibitor | Mepiquat (ISO) chloride | Pix ® |
| Growth inhibitor | Maleic hydrazide (ISO-E) | Sprout Stop ® |
| Growth retardant | Palclobutrazol (ISO) | Bonzi ® |
| Difoliant, ethylene releaser | Ethephon (ANSI) | Prep ® |
| Gibberellin | Gibberellic acid | RyzUp ® |
| Gibberellin | BAP + Gibberellic acid | Accel ® |
| Auxin | α-napththaleneacetic acid (ISO) | Tre-Hold ® |
| Auxin | IBA | Seradix ® |

The aqueous treatment formulation may comprise 1.00 to 3.00 wt %, 1.00 to 2.50 wt %, 1.00 to 2.00 wt %, 1.50 to 2.00 wt %, or 1.50 to 2.50 wt % thickener; 0.05 to 0.10 wt %, 0.05 to 0.15 wt %, 0.05 to 0.50 wt %, 0.05 to 0.15 wt %, 0.10 to 0.40 wt %, 0.20 to 0.30 wt % water soluble divalent salt; 0.05 to 0.10 wt %, 0.05 to 0.15 wt %, 0.05 to 0.50 wt %, 0.05 to 0.15 wt %, 0.10 to 0.40 wt %, 0.15 to 0.35 wt %, 0.20 to 0.30 wt % foam control agent; 1.00 to 3.00 wt %, 1.00 to 2.50 wt %, 1.00 to 2.00 wt %, 1.50 to 2.00 wt %, or 1.50 to 2.50 wt % complexing agent; 0.05 to 0.10 wt %, 0.05 to 0.15 wt %, 0.05 to 0.50 wt %, 0.05 to 0.15 wt %, 0.10 to 0.40 wt %, or 0.20 to 0.30 wt % film forming agent; and 90 to 99 wt %, 92 to 99 wt %, 94 to 99 wt %, 96 to 99 wt %, 97 to 99 wt %, or 98 to 99 wt % water. In accordance with federal and state regulations, the plant treatment formulation may comprise 0.1 to 1.00 wt %, 0.1 to 0.50 wt %, or 0.10 to 0.25 wt % of a plant treatment chemical.

In one embodiment, the aqueous treatment formulation comprises 1.00 to 3.0 wt % of the thickener; 0.05 to 0.15 wt % of the water soluble divalent salt; 0.05 to 0.15 wt % of the foam control agent; 1.00 to 3.00 wt % of the complexing agent; 0.05 to 0.15 wt % of a film forming agent; 90 to 99 wt % water; and 0.1 to 1.00 wt % plant treatment chemical.

In another embodiment, the aqueous treatment formulation comprises 1.60 to 2.40 wt % of the thickener; 0.08 to 0.12 wt % of the water soluble divalent salt; 0.08 to 0.12 wt % of the foam control agent; 1.60 to 2.40 wt % of the complexing agent; 0.08 to 0.12 wt % of a film forming agent; 97.60 to 98.40 wt % water; and 0.10 to 1.00 wt % of a plant treatment chemical.

Alternatively, the aqueous treatment formulation comprises 1.8 to 2.2 wt % of the thickener; 0.09 to 0.11 wt % of the water soluble divalent salt; 0.09 to 0.11 wt % of the foam control agent; 1.8 to 2.2 wt % of the complexing agent; 0.09 to 0.11 wt % of a film forming agent; 97.8 to 98.2 wt % water; and 0.10 to 1.00 wt % of a plant treatment chemical.

In one embodiment, the present invention relates to the harvested plant part of a plant treated with the aqueous treatment formulation having a plant treatment chemical of the present application.

In one embodiment, the method is carried out to prevent post-harvest disease in the harvested plant part. The post-harvest disease may be a fungal disease. Exemplary post-harvest fungal diseases include, but are not limited to, those shown in Table 7. In one embodiment, the post-harvest fungal disease is selected from the group

TABLE 7

Exemplary Fungal Diseases

| Disease | Etiological Agent(s) |
|---|---|
| *Alternaria* brown spot | *Alternaria alternata; Alternaria brassicae; Alternaria brassicicola* |
| *Alternaria* stem-end rot (black rot) | *Alternaria citri* |
| Anthracnose | *Glomerella cingulata; Colletotrichum gleosporioides* |
| Black mold rot | *Aspergillus niger* |
| Black root rot | *Thielaviopsis basicola; Chalara elegans* |
| Black spot | *Guignardia citricarpa; Phyllosticta citricarpa* |
| Blue mold | *Penicillium italicum* |
| Branch knot | *Sphaeropsis tumefaciens* |
| Brown rot | *Phytophthora citricola; Phytophthora citrophthora; Phytophthora hibernalis; Phytophthora nicotianae; Phytophthora palmivora; Phytophthora syringae* |
| Charcoal root rot | *Macrophomina phaseolina* |
| Citrus black spot | *Guignardia citricarpa* |
| Damping-off | *Pythium aphanidermatum; Pythium debaryanum; Pythium rostratum; Pythium ultimum; Pythium vexans; Rhizoctonia solani* |
| *Dothiorella* gummosis and rot | *Botryosphaeria ribis; Dothiorella gregaria* |
| Dry root rot complex | *Nectria haematococca; Fusarium solani* |
| Dry rot | *Ashbya gossypii; Nematospora coryli* |
| *Fusarium* rot, wilt | *Fusarium* spp. |
| Flyspeck | *Leptothyrium pomi* |
| Gray mold | *Botrytis cinerea (Botrytis); Botryotinia fuckeliana* |
| Green mold | *Penicillium digitatum* |
| Mancha foliar de los citricos | *Alternaria limicola* |
| Melanose | *Diaporthe citri* |
| Stem-end rot (stem-end rind breakdown) | *Phomopsis citri; Diaporthe citri; Lasiodiplodia theobromae; Diplodia natalensis* |
| *Phytophthora* rot | *Phytophthora citrophthora; Phytophthora hibernalis; Phytophthora nicotianae* var. *Parasitica; Phytophthora palmivora; Phytophthora syringae* |
| Pink mold | *Gliocladium roseum* |
| *Pleopora* rot | *Pleospora herbarum; Stemphylium herbarum* |
| Powdery mildew | *Oidium tingitaninum* |
| Sour rot | *Geotrichum citri-aurantii; Geotrichum candidum; Galactomyces citri-aurantii; Galactomyces candidum; Galactomyces geotrichum* |
| Sooty mold | *Capnodium* spp. |
| Sweet orange scab | *Elsinoë australis* |
| Whisker mold | *Penicillium ulaiense* |
| White root rot | *Rosellinia* sp.; *Rosellinia necatrix; Dematophora necatrix; Rosellinia subiculata* | consisting of green mold, grey mold, blue mold, brown rot, sour rot, black rot, stem-end rind breakdown, anthracnose, powdery mildew, and *Phytophthora* rot.

In another embodiment, the post-harvest disease is selected from the group consisting of powdery mildew, downey mildew, and *Botrytis*. Powdery mildew is a problem in warm, dry weather, spread by spores. Downey mildew is a problem in cooler, wetter weather, spread by spores. Downey mildew may be caused, for example, by *Peronospora belbahrii, Peronospora manshurica, Pseudoperonospora cubensis, Plasmopara viticola, Pseudoperonospora humuli, Plasmopara halstedii*, and *Plasmopara obducens*.

*Botrytis*, unlike powdery mildew and downey mildew, must have nutrients or some food source before it can invade the plant. Nutrients leaking from wounded plants or from dying plant tissue such as old flower petals provide the required nutrients. *Botrytis* is aggressive in high humidity. Sites of infection include wounded plant tissue, fading flowers, broken stems or injured leaves, and seedlings grown under cool, moist conditions. *Botrytis* is mediated by *Peronospora farinosa* (synonyms include: *Botrytis effusa, Botrytis farinosa, Peronospora chenopodii; Peronospora effusa*; and *Peronospora variabilis*).

In one embodiment, the disease is caused by a pathogen selected from the group consisting of of *Alternia alternata, Alternaria citri, Botryotinia fuckeliana, Botrytis cinerea, Colletotrichum gleosporioides, Diaporthe citri, Diplodia natalensis, Geotrichum candidum, Galactomyces geotrichum, Glomerella cingulata, Lasiodiplodia theobromas, Oidium tingitaninum, Penicillium digitatum, Penicillium italicum, Peronospora belbahrii, Peronospora manshurica, Phomopsis citri, Phytophthora citricola, Phytophthora citrophthora, Phytophthora hibernalis, Phytophthora nicotianae, Phytophthora palmivora, Phytophthora syringae, Plasmopara halstedii, Plasmopara obducens, Plasmopara viticola, Pseudoperonospora cubensis*, and *Pseudoperonospora humuli*.

The post-harvest disease may be bacterial disease. Exemplary bacterial diseases include, for example, those shown in Table 8.

TABLE 8

Exemplary Bacterial Diseases

| Disease | Etiological Agent(s) |
| --- | --- |
| Bacterial spot | *Xanthomonas campestris* pv. citrumelo |
| Black pit (fruit) | *Pseudomonas syringae* |
| Blast | *Pseudomonas syringae* |
| Citrus canker | *Xanthomonas axonopodis* |
| Citrus variegated chlorosis | *Xylella fastidiosa* |
| Huanglongbing (citrus greening) | *Candidatus Liberibacter; Candidatus L. africanus* |

In one embodiment, the post-harvest disease is a parasitic disease. Exemplary parasitic diseases include, for example, those shown in Table 9.

TABLE 9

Exemplary Parasitic Diseases

| Disease | Etiological Agent(s) |
| --- | --- |
| Citrus slump nematode | *Pratylenchus coffeae* |
| Dagger nematode | *Xiphinema* spp. |
| Lesion nematode | *Pratylenchus* spp.; *Pratylenchus brachyurus*; *Pratylenchus coffeae*; *Pratylenchus vulnus* |
| Needle nematode | *Longidorus* spp. |
| Sheath nematode | *Hemicycliophora* spp.; *Hemicycliophora arenaria* |
| Slow decline (citrus nematode) | *Tylenchulus semipenetrans* |

In another embodiment, the method is carried out to minimize water loss in the harvested plant part. Water loss or transpiration, refers to water vapor movement from the harvested plant part to the environment.

Alternatively, the method is carried out to extend the post-harvest shelf life of the harvested plant part.

A further aspect of the present invention relates to a method of treating a harvested plant part. This method involves providing a harvested plant part and applying an aqueous treatment formulation to the harvested plant part, where the aqueous treatment formulation comprises a thickener, a water soluble divalent salt, a foam control agent, a complexing agent, a film forming agent, and water, and where the aqueous treatment formulation, when applied to a surface of a harvested plant part, creates a water fast film on the surface that permits permeation of an aqueous material to the harvested plant part while minimizing loss of moisture or loss of a plant treatment chemical from the harvested plant part as compared to when the aqueous treatment formulation is not applied to the surface of the harvested plant part.

The harvested plant part may be selected from the group consisting of a flower, a fruit, a vegetable, and a herb.

In one embodiment, the harvested plant part is a flower. The flower may be selected from the group consisting of *Arabidopsis thaliana*, African violet, alstromeria, anemone, aster, azalea, *begonia*, bellflower, *bougainvillea*, buttercup, cactus, *camellia*, carnation, *chrysanthemum, clematis*, cockscomb, columbine, cosmos, cyclamen, daffodil, dahlia, daisy, false cypress, forsythia, freesia, *gardenia, gladioli*, hibiscus, hollyhock, *hydrangea*, iris, lilac, lily, mum, peony, *pelargonium, petunia*, poinsettia, poppy, rose, saintpaulia, snapdragon, statice, sunflower, tulip, orchid, waxflower, and *zinnia*.

As described above, the harvested plant part may be a fruit. The fruit may be selected from the group consisting of alfalfa, apple, apricot, avocado, banana, blueberry, barley, bean, corn, cucumber, eggplant, grape, grapefruit, kiwi, mango, melon, nectarine, orange, *papaya*, pea, peach, peanut, pear, pepper, pineapple, pumpkin, raspberry, rice, rye, sorghum, soybean, strawberry, squash, sunflower, turnip, tomato, wheat, and zucchini.

The harvested plant part may be a vegetable. The vegetable may be selected from the group consisting of asparagus, beet, broccoli, brussel sprout, cabbage, carrot, cauliflower, celery, endive, garlic, leek, lettuce, parsnip, spinach, turnip, and yam.

Alternatively, the harvested plant part is a herb. The herb may be selected from the group consisting of basil, chicory, chives, coriander, dill, lavender, mint, parsley, rosemary, and thyme.

The applying may be carried out 48 hours after harvesting, 24 hours after harvesting, or 12 hours after harvesting.

In accordance with this aspect of the invention, the thickener, the water soluble divalent salt, the foam control agent, the complexing agent, and the film forming agent of the aqueous treatment formulation of the present invention are selected as described above.

As described above, the aqueous treatment formulation may comprise 1.00 to 3.00 wt % of the thickener; 0.05 to 0.15 wt % of the water soluble divalent salt; 0.05 to 0.15 wt % of the foam control agent; 1.00 to 3.00 wt % of the complexing agent; 0.05 to 0.15 wt % of a film forming agent; and 90 to 99 wt % water.

In another embodiment, the aqueous treatment formulation comprises 1.60 to 2.40 wt % of the thickener; 0.08 to 0.12 wt % of the water soluble divalent salt; 0.08 to 0.12 wt % of the foam control agent; 1.60 to 2.40 wt % of the complexing agent; 0.80 to 0.12 wt % of a film forming agent; and 97.60 to 98.40 wt % water.

Alternatively, the aqueous treatment formulation comprises 1.80 to 2.20 wt % of the thickener; 0.09 to 0.11 wt % of the water soluble divalent salt; 0.09 to 0.11 wt % of the foam control agent; 1.80 to 2.20 wt % of the complexing agent; 0.09 to 0.11 wt % of a film forming agent; and 97.80 to 98.20 wt % water.

In one embodiment, the present invention relates to the harvested plant part treated with the aqueous treatment formulation of the present application.

In another embodiment, the method further comprises applying a plant treatment chemical to the harvested plant part. The plant treatment chemical may be a pesticide. As described above, the pesticide may be selected from the group consisting of an insecticide, a fungicide, a miticide, and a nematicide.

In accordance with this embodiment, the aqueous treatment formulation may comprise 1.00 to 3.00 wt % of the thickener; 0.05 to 0.15 wt % of the water soluble divalent salt; 0.05 to 0.15 wt % of the foam control agent; 1.00 to 3.00 wt % of the complexing agent; 0.05 to 0.15 wt % of a film forming agent; 90 to 99 wt % water; and 0.10 to 1.00 wt % of a plant treatment chemical.

In another embodiment, the aqueous treatment formulation comprises 1.60 to 2.40 wt % of the thickener; 0.08 to 0.12 wt % of the water soluble divalent salt; 0.08 to 0.12 wt % of the foam control agent; 1.60 to 2.40 wt % of the complexing agent; 0.80 to 0.12 wt % of a film forming agent; 97.60 to 98.40 wt % water; and 0.10 to 1.00 wt % of a plant treatment chemical.

Alternatively, the plant treatment chemical formulation comprises 1.80 to 2.20 wt % of the thickener; 0.09 to 0.11 wt % of the water soluble divalent salt; 0.09 to 0.11 wt % of the foam control agent; 1.80 to 2.20 wt % of the complexing agent; 0.09 to 0.11 wt % of a film forming agent; 97.80 to 98.20 wt % water, and 0.10 to 1.00 wt % of a plant treatment chemical.

In one embodiment, the present invention relates to the harvested plant part treated with the aqueous plant treatment formulation having a plant treatment chemical of the present application.

The method may be carried out to prevent a post-harvest disease in the harvested plant part. The post-harvest disease may be a fungal disease. As described above, exemplary fungal diseases include, but are not limited to, green mold, grey mold, blue mold, brown rot, sour rot, black rot, stem-end rind breakdown, anthracnose, powdery mildew, and *Phytophthora* rot.

As described above, the post-harvest disease is selected from the group consisting of powdery mildew, downey mildew, and *Botrytis*. Alternatively, the post-harvest disease may be a bacterial disease or a parasitic disease.

In one embodiment, the disease is caused by a pathogen selected from the group consisting of of *Alternia alternata, Alternaria citri, Botryotinia fuckeliana, Botrytis cinerea, Colletotrichum gleosporioides, Diaporthe citri, Diplodia natalensis, Geotrichum candidum, Galactomyces geotrichum, Glomerella cingulata, Lasiodiplodia theobromas, Oidium tingitaninum, Penicillium digitatum, Penicillium italicum, Peronospora belbahrii, Peronospora manshurica, Phomopsis citri, Phytophthora citricola, Phytophthora citrophthora, Phytophthora hibernalis, Phytophthora nicotianae, Phytophthora palmivora, Phytophthora syringae, Plasmopara halstedii, Plasmopara obducens, Plasmopara viticola, Pseudoperonospora cubensis*, and *Pseudoperonospora humuli*.

The method may be carried out to minimize water loss in the harvested plant part. Alternatively, the method is carried out to extend post-harvest shelf life of the harvested plant part.

Another aspect of the present invention relates to a method of treating a plant. This method involves providing a plant having a plant part and applying an aqueous treatment formulation to the plant, where the aqueous treatment formulation creates a coating on the plant upon drying of the aqueous treatment formulation. The method further involves harvesting the plant part after said applying, where the aqueous treatment formulation, when applied to a surface of a plant, creates a water fast film on the surface that permits permeation of an aqueous material to the plant while minimizing loss of moisture or loss of a plant treatment chemical from the plant as compared to when the composition is not applied to the surface of the plant.

The plant and plant part may be selected as described above.

In one embodiment, the plant part is harvested within 48 hours of applying the aqueous treatment formulation, as described above.

In another embodiment, the invention relates to the harvested plant part.

The method may further involve applying a plant treatment chemical to the plant. Suitable plant treatment chemicals are described in detail above. In accordance with this embodiment, the present invention relates to the harvested plant part of the plant which has been treated with the aqueous plant treatment formulation of the present invention.

As described in detail above, the methods of the present invention may be carried out to prevent post-harvested disease in the harvested plant part, to minimize water loss in the harvested plant part, or to extend post-harvest shelf life in the harvested plant part.

Yet another aspect of the present invention relates to a method of treating a harvested plant part. This method involves providing a harvested plant part and applying an aqueous treatment formulation to the harvested plant part, where the aqueous treatment formulation creates a coating on the harvested plant part upon drying of the aqueous treatment formulation, and where the aqueous treatment formulation, when applied to a surface of a harvested plant part, creates a water fast film on the surface that permits permeation of an aqueous material to the harvested plant part while minimizing loss of moisture or loss of a plant treatment chemical from the harvested plant part as compared to when the aqueous treatment formulation is not applied to the surface of the harvested plant part.

The harvested plant parts may be selected as described above.

In one embodiment, the applying is carryout about 48 hours after harvesting, as described above.

In another embodiment, the invention relates to the harvested plant part treated with the aqueous plant treatment formulation of the present invention.

The method may further involve applying a plant treatment chemical to the harvested plant part. Suitable plant treatment chemicals are described in detail above. In accordance with this embodiment, the present invention relates to the harvested plant part treated with the aqueous plant treatment formulation of the present invention having a plant treatment chemical according to the present invention.

As described in detail above, the methods of the present invention may be carried out to prevent post-harvested disease in the harvested plant part, to minimize water loss in the harvested plant part, or to extend post-harvest shelf life in the harvested plant part.

The methods of the present invention are directed to the pre-harvest application of an aqueous treatment formulation to a plant having a plant part or to the post-harvest application of an aqueous treatment formulation to a plant part. As used herein, the term "post-harvest" refers to the point in time in which an agricultural commodity is harvested for sale, trade, consumption, or other human use. With respect to edible commodities, e.g., fruit and vegetables, or non-edible commodities that are picked, e.g., flowers, the commodity begins its existence as "post-harvest" after picking. For non-edible commodities, e.g., trees, shrubs, flowering plants, and/or seedling stocks, post-harvest is the point at which the commodity is packed, harvested, or otherwise prepared for marketing.

The methods of the present invention are distinct from a pre-harvest treatment of growing plants (which is not the subject of the present invention). The term "pre-harvest" refers to an agricultural commodity such as a plant, plant part (e.g., flower or seed) that is still attached to a tree, shrub, flowering plant, etc. or still in the ground (e.g., a carrot or tuber) at any point in time before being harvested (e.g., detached from a tree, shrub, or flowering plant, or extirpated from the ground or cleaved, cut, or otherwise removed from a stalk, stem, vine, etc.) for sale, trade, consumption, or other human use. The plants of the present invention have a plant part ready for harvest.

EXAMPLES

Example 1—Transpiration in Harvested *Hydrangea* Flowers

Figure 1B:
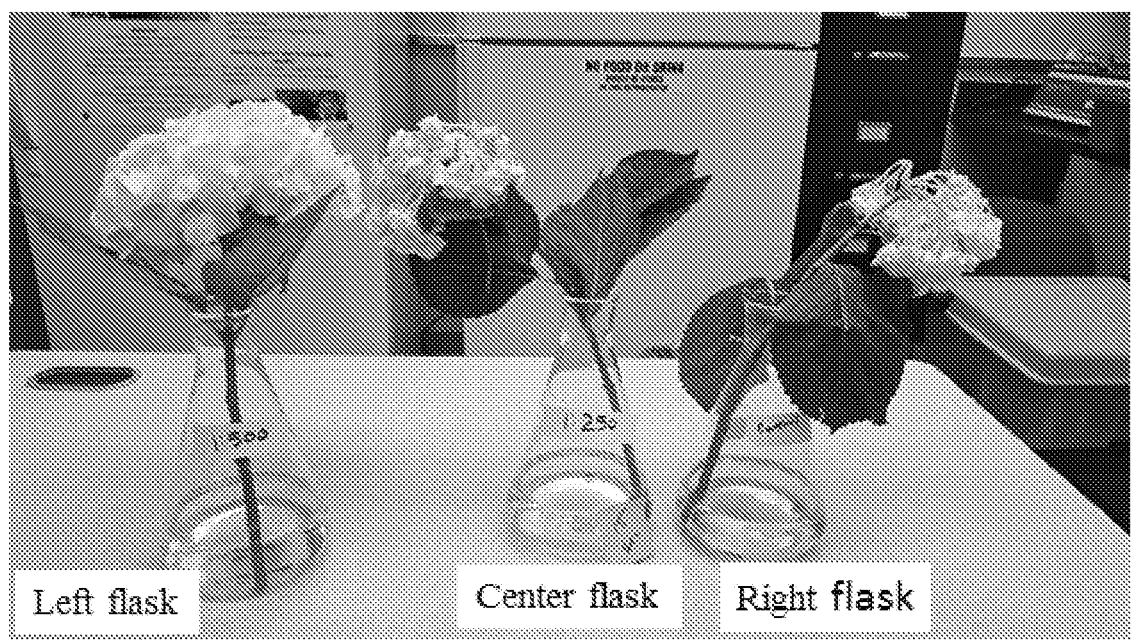

*Hydrangea* plants were obtained from a grocer. Four stems were harvested from plants and transferred to a vat of water in a room held at a constant temperature of 73° F. (FIG. 1A). Harvested stems were spray treated at the standard rate (a 1:500 dilution of a concentrated treatment formulation in water) or at double the standard rate (a 1:250 dilution of a concentrated treatment formulation in water) with an aqueous treatment formulation. Plants treated at the standard rate were sprayed with an aqueous treatment formulation comprising 95.70 wt % water, 2.00 wt % ACUSOL® 823, 0.10 wt % PVA (100,000 MW), 0.10 wt % $ZnSO_4$ monohydrate, 0.10 wt % Antifoam® 8810, and 2.00 wt % TEA. Unsprayed harvested stems were used as a control. Harvested *hydrangea* stems were incubated at 73° F. for five days. FIGS. 1A-1B show that harvested stems treated with the aqueous treatment formulation at the standard rate appeared similar to the *hydrangea* stems on the day of harvest (FIGS. 1A-1B, left flasks), whereas plants treated with the aqueous treatment formulation at double the standard rate exhibited substantial decomposition (FIGS. 1A-1B, center flasks). The control harvested *Hydrangea* stem exhibited almost complete decomposition on Day 5 (FIGS. 1A-1B, right flasks).

Example 2—Water Retention and Disease Protection in Harvested Yellow Squash

Figure 2:
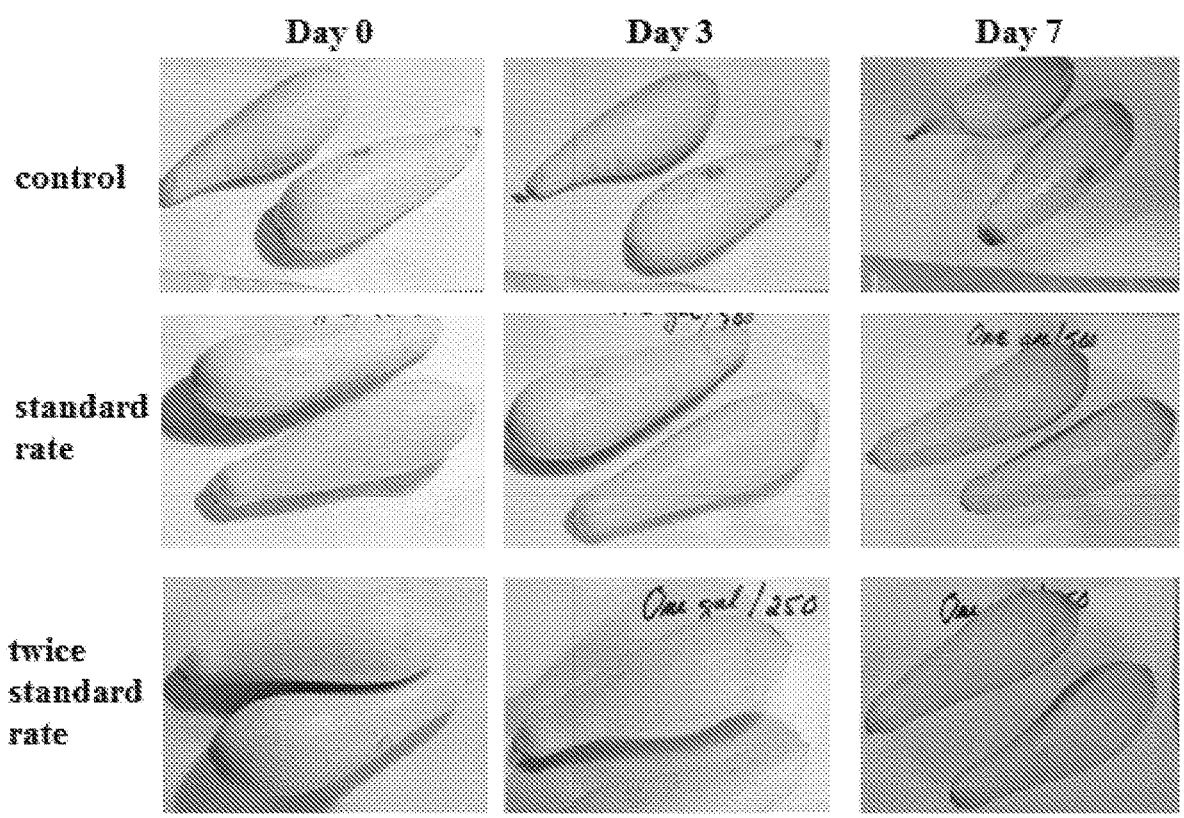
FIG. 2 shows images of harvested yellow squash on Day 0, Day 3, and Day 7. Harvested yellow squash were spray treated on Day 0 with an aqueous treatment formulation of the present application comprising 95.70 wt % water, 2.00 wt % ACUSOL® 823, 0.10 wt % PVA (100,000 MW), 0.10 wt % $ZnSO_4$ monohydrate, 0.10 wt % Antifoam® 8810, and 2.00 wt % TEA. Untreated harvested squash were used as a control.

Harvested yellow squash were spray treated at the standard rate (a 1:500 dilution of a concentrated treatment formulation in water) or twice the standard rate (a 1:250 dilution of a concentrated treatment formulation in water) with an aqueous treatment formulation. Squash treated at the standard rate was sprayed with an aqueous treatment formulation 95.70 wt % water, 2.00 wt % ACUSOL® 823, 0.10 wt % PVA (100,000 MW), 0.10 wt % $ZnSO_4$ monohydrate, 0.10 wt % Antifoam® 8810, and 2.00 wt % TEA. Unsprayed harvested yellow squash were used as control. Treated and untreated control squash were incubated at 73° F. for seven days. FIG. 2 shows squash on Days 0, 3, and 7 after treatment. On Day 3, the squash showed evidence of decay. Control fruit exhibited dehydration and slight decay around the stem end of the fruit (FIG. 2). Similar evidence of desiccation was present on fruit treated at twice the standard rate, although this was not nearly as advanced as the control (FIG. 2). The fruit treated at the standard rate appeared to be in the same condition on Day 3, as it had been on Day 0. By Day 7, the decay was more evident on all samples, with the exception of the fruit treated at the standard rate. Control fruit exhibited advanced decay and dehydration around the stem end, fruit treated at twice the standard rate started to exhibit advanced decay around the stem end and slight dehydration, and fruit treated at the standard rate was just as firm and decay free as it was on Day 0. These data clearly show that fruit treated at the standard rate had provided the best level of decay control and water retention.

Example 3—Water Retention and Disease Protection in Harvested Grapefruit

Grapefruit trees were separated into three groups. Fruit in Groups 2 and 3 were treated prior to harvesting. Group 3 was treated with an aqueous treatment formulation comprising 95.70 wt % water, 2.00 wt % ACUSOL® 823, 0.10 wt % PVA (100,000 MW), 0.10 wt % $ZnSO_4$ monohydrate, 0.10 wt % Antifoam® 8810, and 2.00 wt % TEA. Group 2 was treated with mono potassium phosphate ("MKP"), a commercial fertilizer. Group 1 was untreated and served as a control. Groups 2 and 3 fruit were spray treated on Day −14 in the grove. Fruit was not de-greened. Fruit was weighed on Day 0, prior to packaging. Size 27-36 fruit were packed in honeycomb cartons, whereas size 40 fruit was packed in regular 4/5 cartons. Packed fruit was inspected on Day 68. As shown in Table 10 below, Group 3 fruit exhibited the least amount of water loss. The difference

TABLE 10

Water Retention and Disease Protection in Harvested Grapefruit

| Group | Treatment | Fruit Size | Weight (lbs) Day 0 | Day 54 | Δ Weight (lbs) | Weight Difference (%) | Disease | Fruit Condition |
|---|---|---|---|---|---|---|---|---|
| 1 | Control | 40 | 39 | 35 | 4 | 9.75 | 1 rot, 2 pitting | |
|   | Control | 40 | 39.4 | 35 | 4.4 | 11 | 3 rot | very soft |
|   | Control | 36 | 40.4 | 35 | 5.4 | 13 | none | no shine |
|   | Control | 36 | 40.6 | 34.2 | 6.4 | 16 | 2 rot, 1 puncture | |
|   | Control | 32 | 41.2 | 35.8 | 5.4 | 13 | 2 rot | |
|   | Control | 32 | 41.2 | 35.8 | 5.4 | 13 | 2 rot | |
|   | Control | 27 | 39.6 | 34.2 | 5.4 | 14 | 2 rot | |
|   | Control | 27 | 39.6 | 34.2 | 5.4 | 14 | 1 rot | |
| 2 | MKP | 40 | 39 | 34.4 | 4.6 | 12 | 1 rot | |
|   | MKP | 40 | 39.6 | 35.4 | 4.2 | 11 | 1 rot | no shine |

TABLE 10-continued

Water Retention and Disease Protection in Harvested Grapefruit

| Group | Treatment | Fruit Size | Weight (lbs) Day 0 | Weight (lbs) Day 54 | Δ Weight (lbs) | Weight Difference (%) | Disease | Fruit Condition |
|---|---|---|---|---|---|---|---|---|
| | MKP | 36 | 40.4 | 34.8 | 5.6 | 14 | 4 rot | Like control |
| | MKP | 36 | 40.6 | 34.8 | 5.8 | 14 | 3 rot | very soft |
| | MKP | 32 | 41 | 35.4 | 5.6 | 14 | 1 rot, 1 puncture | |
| | MKP | 32 | 40.6 | 35.4 | 5.2 | 13 | none | |
| | MKP | 27 | 40.4 | 36 | 4.4 | 11 | 1 rot | |
| | MKP | 27 | 40.4 | 35.8 | 4.6 | 11 | none | |
| 3 | AF* | 40 | 39.4 | 35 | 4.4 | 11 | none | |
| | AF* | 40 | 39.2 | 34.6 | 4.6 | 12 | 1 rot | Peel in better condition |
| | AF* | 36 | 40.6 | 35 | 5.6 | 14 | none | significantly better shine |
| | AF* | 36 | 40.6 | 36.2 | 4.4 | 11 | none | very firm** |
| | AF* | 32 | 41.4 | 36.8 | 4.6 | 11 | none | |
| | AF* | 32 | 41.2 | 37 | 4.2 | 10 | none | |
| | AF* | 27 | 41.6 | 36.8 | 4.8 | 12 | none | |
| | AF* | 27 | 40.2 | 35.2 | 5 | 12 | 1 rot | |

*Group 3 fruit was treated with an aqueous treatment formulation ("AF") comprising 95.70 wt % water, 2.00 wt % ACUSOL® 823, 0.10 wt % PVA (100,000 MW), 0.10 wt % ZnSO$_4$ monohydrate, 0.10 wt % Antifoam® 8810, and 2.00 wt % TEA.
**2/3 fruit per carton were very firm between Group 1 and Group 2 fruit in terms of firmness and shine was negligible. Moreover, Group 3 had significantly better shine and firmness than the control and MKP group (Table 11).

TABLE 11

Water Retention in Harvested Grapefruit

| Group | Treatment | Average Δ Weight (lbs) | Average Weight Difference (%) |
|---|---|---|---|
| 1 | Control | 5.2 | 12.97 |
| 2 | MKP | 5 | 12.5 |
| 3 | AF* | 4.7 | 11.63 |

*Group 3 fruit was treated with an aqueous treatment formulation ("AF") comprising 95.70 wt % water, 2.00 wt % ACUSOL® 823, 0.10 wt % PVA (100,000 MW), 0.10 wt % ZnSO$_4$ monohydrate, 0.10 wt % Antifoam® 8810, and 2.00 wt % TEA.

Example 4—Water Retention and Disease Protection in Harvested Grapefruit

Grapefruit was harvested on Day 0 and packed on Day 6. Packed fruit was refrigerated at 48° F. on Day 8. On Day 54, fruit was held at the ambient temperature of the packing house, which ranged from 68-72° F. at night and 78-82° F. during the day. Harvested grapefruit were separated into two groups. Group 1 was used as an untreated control. Group 2 was treated prior to harvest with an aqueous treatment formulation comprising 95.70 wt % water, 2.00 wt % ACUSOL® 823, 0.10 wt % PVA (100,000 MW), 0.10 wt % ZnSO$_4$ monohydrate, 0.10 wt % Antifoam® 8810, and 2.00 wt % TEA. As shown in Table 12,

TABLE 12

Post-Harvest Water Retention and Disease Protection in Grapefruit

| Group | Size | Weight (lbs) Day 8 | Weight (lbs) Day 54 | Weight (lbs) Day 100 | Δ Weight (lbs) | Disease Rot | Disease Anthracnose | Fruit Condition |
|---|---|---|---|---|---|---|---|---|
| 1 | 48 | 36.2 | — | — | — | — | — | — |
| | 48 | 36.8 | 36.0 | 33.5 | 3.3 | 1 | 0 | fruit ok |
| | 40 | 35.8 | 35.5 | 33.5 | 2.3 | 4 | 1 | |
| | 40 | 34.8 | 34.5 | 31.0 | 3.8 | 3 | 1 | |
| | 36 | 34.2 | 33.5 | 31.0 | 3.2 | 4 | 1 | |
| | 36 | 34.8 | 34.0 | 31.0 | 3.8 | 1 | 0 | |
| | 32 | 34.2 | — | — | — | — | — | — |
| | 32 | 33.2 | 32.5 | 29.5 | 3.7 | 5 | 0 | fruit soft |
| 2 | 48 | 36.4 | 35.5 | 34.3 | 2.1 | 1 | 1 | fruit soft |
| | 48 | 35.8 | 35.0 | 33.9 | 1.9 | 2 | 0 | fruit soft |
| | 40 | 33.8 | 33.0 | 31.6 | 2.2 | 0 | 2 | fruit good |
| | 40 | 33.2 | 33.0 | 31.5 | 1.7 | 0 | 2 | fruit good |
| | 36 | 34.2 | 34.0 | 32.0 | 2.2 | 0 | 1 | fruit good |
| | 36 | 34.4 | 33.5 | 33.0 | 1.4 | 0 | 0 | fruit good |
| | 32 | 34.4 | 33.5 | 32.4 | 2.0 | 1 | 0 | 1 soft |
| | 32 | 35.6 | 34.5 | 33.8 | 1.8 | 2 | 1 | fruit good |

*Group 2 fruit was treated with an aqueous treatment formulation comprising 95.70 wt % water, 2.00 wt % ACUSOL® 823, 0.10 wt % PVA (100,000 MW), 0.10 wt % ZnSO$_4$ monohydrate, 0.10 wt % Antifoam® 8810, and 2.00 wt % TEA.

most of the fruit treated with the aqueous treatment formulation of the present invention was in good condition at the end of the trial. In particular, 90% of the fruit in Group 2 was in firm, good condition at the end of this trial. The incidence of anthracnose was expected as the peel of the fruit was very immature at the start of the season. Moreover, fruit was harvested two weeks after heavy rains. Heavy rains minimize weight loss and maximize the possibility for decay in both control and treated fruit. The results of this trial verify that the difference in "weight loss" between Group 1 and Group 2 fruit was minimal. However, the difference in decay was rather large, with 9.5% decay in Group 1 (control) compared to less than 1% decay in Group 2 (fruit sprayed with the aqueous treatment formulation of the present invention), i.e., an 8% difference in decay over the 92 day period of the trial.

Example 5—Protection Against Water-Loss and Stem-End Rind Breakdown in Harvested Fruit Grapefruit trees were separated into three groups. On Day −5, fruit was untreated (Group 1, Control), treated with di-potassium phosphate fertilizer ("DKP") (Group 2), or treated with an aqueous formulation comprising 95.70 wt % water, 2.00 wt % ACUSOL® 823, 0.10 wt % PVA (100,000 MW), 0.10 wt % $ZnSO_4$ monohydrate, 0.10 wt % Antifoam® 8810, and 2.00 wt % TEA (Group 3). Spray treatment formulations were applied using a commercial air-blast sprayer (250 gallons/acre). Size 40 fruit were harvested in quadruplicate, washed, and waxed on Day 0. The washed and waxed fruit as then stored at ambient conditions (approximately 70-75° F.) for 40 days. Size 40 fruit harvested on Day 1 were left unwashed and unwaxed prior to storage (unwashed and unwaxed samples).

To test the ability of the aqueous formulation of the present invention to protect harvested fruit from water loss, stored fruit were observed 8 and 20 days after harvest. As shown in Table 13 below, fruit treated with the aqueous formulation lost

TABLE 13

Post-Harvest Water-Loss Protection in Fruit

| Treatment | Washed and Waxed | Weight (g) | Wt. Loss (%) Day 8 | Wt. Loss (%) Day 20 |
|---|---|---|---|---|
| Control | No | 358.71 c | 1.26 b | 3.9 a |
| DKP | No | 366.95 bc | 1.43 a | 4.08 a |

TABLE 13-continued

Post-Harvest Water-Loss Protection in Fruit

| Treatment | Washed and Waxed | Weight (g) | Wt. Loss (%) Day 8 | Wt. Loss (%) Day 20 |
|---|---|---|---|---|
| Aqueous Formulation* | No | 399.56 ab | 1.46 a | 4.22 a |
| Control | Yes | 364.25 c | 1.03 c | 3.27 b |
| DKP | Yes | 389.14 abc | 1.11 c | 3.89 a |
| Aqueous Formulation* | Yes | 406.01 a | 1.03 c | 3.21 b |
| P-values | | 0.0112 | <.0001 | <.0001 |

*The aqueous treatment formulation comprised 95.70 wt % water, 2.00 wt % ACUSOL® 823, 0.10 wt % PVA (100,000 MW), 0.10 wt % $ZnSO_4$ monohydrate, 0.10 wt % Antifoam® 8810, and 2.00 wt % TEA.

significantly more weight than untreated fruit after harvest if the fruit was left unwashed and unwaxed. However, after washing and waxing, the pre-harvest aqueous formulation application had no effect on fruit loss. For unwaxed/unwashed fruit, weight loss was the same for all treated fruit (approximately 1.45%), whereas weight loss was significantly less for unwashed/unwaxed control fruit (1.26%). For fruit that was washed and waxed prior to storage, there were no significant differences in weight at 8 days post-harvest.

After 40 days in storage, no significant differences were observed between treated and untreated fruit in terms of the percentage of healthy fruit and the percentage of total decay in the two groups. As shown in Table 14 below, fruit in Group 3 had a

TABLE 14

Post-Harvest Disease Protection in Fruit

| Group | Treatment | Healthy (%) | Diplodia (%) | Anthracnose (%) | Green Mold (%) | Total Decay (%) | SERB* (%) |
|---|---|---|---|---|---|---|---|
| 1 | Control | 76.68 | 8.8 | 1.88 | 0.63 | 10.62 | 13.13 ab |
| 2 | DKP | 77.15 | 6.5 | 5.9 | 3.96 | 16.31 | 7.15 ab |
| 3** | Aqueous Formulation | 89.38 | 6.3 | 0.6 | 1.88 | 9.38 | 1.25 c |
| | P-values | 0.125 | 0.8 | 0.1 | 0.43 | 0.66 | 0.0001 |

*Stem-end rind breakdown ("SERB")
**Group 3 fruit was treated with an aqueous treatment formulation comprising 95.70 wt % water, 2.00 wt % ACUSOL® 823, 0.10 wt % PVA (100,000 MW), 0.10 wt % $ZnSO_4$ monohydrate, 0.10 wt % Antifoam® 8810, and 2.00 wt % TEA.

greater percentage of healthy fruit as compared to either Group 1 (Control) or Group 2 (DKP treated fruit). Table 14 also shows that the percentage of stem-end rind breakdown was significantly decreased in the experimental group (1.25%), as compared to fruit treated with DKP (7.15%) and untreated control fruit (13.13%).

Example 6—Protection Against Water-Loss and Disease in Harvested Fruit

Figure 3A:
FIGS. 3A-3C show grapefruit fruit treated prior to harvest (FIG. 3A) or after harvest (FIGS. 3B-3C).
Figure 3B:
Figure 3C:
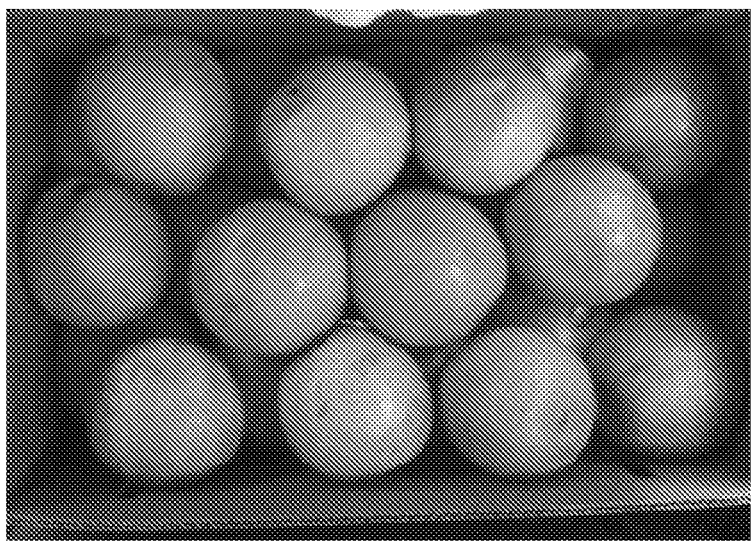

Harvested fruit was treated in the grove with an aqueous formulation comprising 95.70 wt % water, 2.00 wt % ACUSOL® 823, 0.10 wt % PVA (100,000 MW), 0.10 wt % $ZnSO_4$ monohydrate, 0.10 wt % Antifoam® 8810, and 2.00 wt % TEA. Treated fruit was packaged and stored for 106 days without refrigeration. FIG. 3A shows fruit prior to harvest. 106 days after treatment, untreated fruit showed evidence of decay (FIG. 3B), whereas treated fruit appeared to have been processed only a few days prior (FIG. 3C).

Although preferred embodiments have been depicted and described in detail herein, it will be apparent to those skilled

What is claimed:

1. A method of treating a plant, said method comprising:
   providing a plant having a plant part;
   applying an aqueous treatment formulation to the plant, wherein the aqueous treatment formulation comprises:
   (i) a thickener selected from the group consisting of a hydrophobically-modified ethoxylated urethane rheology (HEUR) polymer, a hydrophobically-modified alkali swellable emulsion (HASE) polymer, a hydrophobically-modified polyether (HMPE) polymer, a hydrophobically modified ethoxylated aminoplast (HEAT) polymer, and mixtures thereof,
   (ii) a water soluble divalent salt, wherein the water soluble divalent salt comprises a divalent cation selected from the group consisting of barium, calcium, cobalt (II), copper (II), iron (II), magnesium, manganese (II), strontium, zinc (II), and mixtures thereof,
   (iii) a foam control agent,
   (iv) a metal ion complexing agent,
   (v) a film forming agent having a molecular weight of about 80,000 to about 150,000, wherein the film forming agent is a polyvinyl alcohol, polyvinyl acetate, or a mixture thereof, and
   (vi) water; and
   harvesting the plant part after said applying, wherein said aqueous treatment formulation, when applied to a surface of the plant, creates a water fast film on the surface that permits permeation of an aqueous material to the plant and/or the plant part while minimizing loss of moisture or loss of a plant treatment chemical from the plant and/or the plant part as compared to when said composition is not applied to the surface of the plant and/or the plant part.

2. The method of claim 1, wherein the plant is a growing plant.

3. The method of claim 1, wherein the plant is a mature plant.

4. The method of claim 1, wherein the plant is a flowering plant.

5. The method of claim 4, wherein the plant is selected from the group consisting of *Arabidopsis thaliana*, African violet, alstromeria, anemone, aster, azalea, *begonia*, bellflower, *bougainvillea*, buttercup, cactus, *camellia*, carnation, *chrysanthemum, clematis*, cockscomb, columbine, cosmos, cyclamen, daffodil, dahlia, daisy, false cypress, forsythia, freesia, *gardenia, gladioli*, hibiscus, hollyhock, *hydrangea*, iris, lilac, lily, mum, peony, *pelargonium, petunia*, poinsettia, poppy, rose, saintpaulia, snapdragon, statice, sunflower, tulip, orchid, waxflower, and *zinnia*.

6. The method of claim 1, wherein the plant part is an edible plant part.

7. The method of claim 6, wherein the edible plant part is selected from the group consisting of alfalfa, apple, apricot, asparagus, avocado, banana, blueberry, barley, basil, bean, beet, broccoli, brussel sprout, cabbage, canola, carrot, cauliflower, celery, chicory, chives, citrus, corn, coriander, cucumber, dill, eggplant, endive, garlic, grape, grapefruit, kiwi, lavender, leek, lettuce, mango, melon, mint, nectarine, oregano, orange, *papaya*, parsley, parsnip, pea, peach, peanut, pear, pepper, pineapple, potato, pumpkin, radish, raspberry, rice, rosemary, rye, sweet potato, sorghum, soybean, spinach, strawberry, squash, sunflower, thyme, turnip, tomato, wheat, yam, and zucchini.

8. The method of claim 1, wherein the plant part is selected from the group consisting of a flower, a fruit, a vegetable, and an herb.

9. The method of claim 8, wherein the plant part is a flower.

10. The method of claim 9, wherein the flower is selected from the group consisting of *Arabidopsis thaliana*, African violet, alstromeria, anemone, aster, azalea, *begonia*, bellflower, *bougainvillea*, buttercup, cactus, *camellia*, carnation, *chrysanthemum, clematis*, cockscomb, columbine, cosmos, cyclamen, daffodil, dahlia, daisy, false cypress, forsythia, freesia, *gardenia, gladioli*, hibiscus, hollyhock, *hydrangea*, iris, lilac, lily, mum, peony, *pelargonium, petunia*, poinsettia, poppy, rose, saintpaulia, snapdragon, statice, sunflower, tulip, orchid, waxflower, and *zinnia*.

11. The method of claim 8, wherein the plant part is a fruit.

12. The method of claim 11, wherein the fruit is selected from the group consisting of alfalfa, apple, apricot, avocado, banana, blueberry, barley, bean, corn, cucumber, eggplant, grape, grapefruit, kiwi, mango, melon, nectarine, orange, *papaya*, pea, peach, peanut, pear, pepper, pineapple, pumpkin, raspberry, rice, rye, sorghum, soybean, strawberry, squash, sunflower, turnip, tomato, wheat, and zucchini.

13. The method of claim 8, wherein the plant part is a vegetable.

14. The method of claim 13, wherein the vegetable is selected from the group consisting of asparagus, beet, broccoli, brussel sprout, cabbage, carrot, cauliflower, celery, endive, garlic, leek, lettuce, parsnip, spinach, turnip, and yam.

15. The method of claim 8, wherein the plant part is a herb.

16. The method of claim 15, wherein the herb is selected from the group consisting of basil, chicory, chives, coriander, dill, lavender, mint, parsley, rosemary, and thyme.

17. The method of claim 1, wherein the plant part is harvested within about 12 hours, about 24 hours, or about 48 hours of applying the aqueous treatment formulation.

18. The method of claim 1, wherein the water soluble divalent salt is selected from the group consisting of zinc (II) acetate, zinc (II) bromide, zinc (II) chlorate, zinc (II) chloride, zinc (II) fluoride, zinc (II) formate, zinc (II) iodide, zinc (II) nitrate, zinc (II) sulfate monohydrate, zinc (II) sulfate heptahydrate, zinc (II) sulfate hexahydrate, zinc (II) sulfate anhydrous, and mixtures thereof.

19. The method of claim 1, wherein the foam control agent is selected from the group consisting of alkyl polyacrylates, fatty acids, fatty alcohols, monoglycerides, diglycerides, triglycerides, a silicone-based foam control agent, and mixtures thereof.

20. The method of claim 1, wherein the metal ion complexing agent is selected from the group consisting of diethylenetriaminepentaacetic acid, ethylenedinitrilotetraacetic acid, nitrilotriacetic acid, diethanolamine, triethanolamine, and mixtures thereof.

21. The method of claim 1, wherein the film forming agent is polyvinyl alcohol.

22. The harvested plant part made by the method of claim 1.

23. The method of claim 1, wherein said method further comprises:
   applying a plant treatment chemical to the plant.

24. The method of claim 23, wherein the plant treatment chemical is selected from the group consisting of a pesticide and a growth regulating agent.

25. The method of claim 24, wherein the plant treatment chemical is a pesticide selected from the group consisting of an insecticide, a fungicide, a miticide, and a nematicide.

26. The method of claim 25, wherein the plant treatment chemical is an insecticide selected from the group consisting of carbamates, organochlorines, nicotinoids, phosphoramidothioates, organophosphates, pyrethroids and combinations thereof.

27. The method of claim 25, wherein the plant treatment chemical is a fungicide selected from the group consisting of aliphatic nitrogens, benzimidazoles, dicarboximides, dithiocarbamates, imidazoles, strobins, anilides, aromatics, sulfur derivatives, copper derivatives, and combinations thereof.

28. The method of claim 25, wherein the plant treatment chemical is a miticide selected from the group consisting of carbamates, carbazates, diphenyl oxazolines, glycides, macrocylic compounds, METI-acaracides, napthoquinone derivatives, organochlorines, organophosphates, organotins, oils, pyrethroids, pyridazinone, pyrroles, soaps, sulfur, tetrazines, tetronic acids, and combinations thereof.

29. The method of claim 25, wherein the plant treatment chemical is a nematicide selected from the group consisting of carbamates, organophosphates, halogenated hydrocarbons, methyl isothiocyanate liberators, and combinations thereof.

30. The harvested plant part made by the method of claim 23.

31. The method of claim 1, wherein said method is carried out to prevent post-harvest disease in the harvested plant part.

32. The method of claim 31, wherein the post-harvest disease is a fungal disease.

33. The method of claim 31, wherein the disease is caused by a pathogen selected from the group consisting of Alternia alternata, Alternaria citri, Botryotinia fucehana, Botrytis cinerea, Colletotrichum gleosporioides, Diaporthe citri, Diplodia natalensis, Geotrichum candidum, Galactomyces geotrichum, Glomerella cingulata, Lasiodiplodia theobromae, Oidium tingitaninum, Penicilhum digitatum, Penicilhum italicum, Peronospora belbahrii, Peronospora manshurica, Phomopsis citri, Phytophthora citricola, Phytophthora citrophthora, Phytophthora hibemalis, Phytophthora nicotianae, Phytophthora palmivora, Phytophthora syringae, Plasmopara halstedii, Plasmopara obducens, Plasmopara viticola, Pseudoperonospora cubensis, and Pseudoperonospora humuh.

34. The method of claim 1, wherein said method is carried out to minimize water loss in the harvested plant.

35. The method of claim 1, wherein said method is carried out to extend the post-harvest shelf life of the harvested plant.

36. A method of treating a harvested plant part, said method comprising:
providing a harvested plant part and
applying an aqueous treatment formulation to the harvested plant part, wherein the aqueous treatment formulation comprises:
(i) a thickener selected from the group consisting of a hydrophobically-modified ethoxylated urethane rheology (HEUR) polymer, a hydrophobically-modified alkali swellable emulsion (HASE) polymer, a hydrophobically-modified polyether (HMPE) polymer, a hydrophobically modified ethoxylated aminoplast (HEAT) polymer, and mixtures thereof,
(ii) a water soluble divalent salt, wherein the water soluble divalent salt comprises a divalent cation selected from the group consisting of barium, calcium, cobalt (II), copper (II), iron (II), magnesium, manganese (II), strontium, zinc (II), and mixtures thereof,
(iii) a foam control agent,
(iv) a metal ion complexing agent,
(v) a film forming agent having a molecular weight of about 80,000 to about 150,000, wherein the film forming agent is a polyvinyl alcohol, polyvinyl acetate, or a mixture thereof, and
(vi) water; and wherein said aqueous treatment formulation, when applied to a surface of the harvested plant part, creates a water fast film on the surface that permits permeation of an aqueous material to the harvested plant part while minimizing loss of moisture or loss of a plant treatment chemical from the harvested plant part as compared to when said aqueous treatment formulation is not applied to the surface of the harvested plant part.

37. The method of claim 36, wherein the harvested plant part is selected from the group consisting of a flower, a fruit, a vegetable, and a herb.

38. The method of claim 37, wherein the harvested plant part is a flower.

39. The method of claim 38, wherein the flower is selected from the group consisting of Arabidopsis thaliana, African violet, alstromeria, anemone, aster, azalea, begonia, bellflower, bougainvillea, buttercup, cactus, camellia, carnation, chrysanthemum, clematis, cockscomb, columbine, cosmos, cyclamen, daffodil, dahlia, daisy, false cypress, forsythia, freesia, gardenia, gladioli, hibiscus, hollyhock, hydrangea, iris, lilac, lily, mum, peony, pelargonium, petunia, poinsettia, poppy, rose, saintpaulia, snapdragon, statice, sunflower, tulip, orchid, waxflower, and zinnia.

40. The method of claim 37, wherein the harvested plant part is a fruit.

41. The method of claim 40, wherein the fruit is selected from the group consisting of alfalfa, apple, apricot, avocado, banana, blueberry, barley, bean, corn, cucumber, eggplant, grape, grapefruit, kiwi, mango, melon, nectarine, orange, papaya, pea, peach, peanut, pear, pepper, pineapple, pumpkin, raspberry, rice, rye, sorghum, soybean, strawberry, squash, sunflower, turnip, tomato, wheat, and zucchini.

42. The method of claim 37, wherein the harvested plant part is a vegetable.

43. The method of claim 42, wherein the vegetable is selected from the group consisting of asparagus, beet, broccoli, brussel sprout, cabbage, carrot, cauliflower, celery, endive, garlic, leek, lettuce, parsnip, spinach, turnip, and yam.

44. The method of claim 43, wherein the harvested plant part is a herb.

45. The method of claim 44, wherein the herb is selected from the group consisting of basil, chicory, chives, coriander, dill, lavender, mint, parsley, rosemary, and thyme.

46. The method of claim 36, wherein said applying is carried out about 12 hours, about 24 hours, or about 48 hours after harvesting.

47. The method of claim 36, wherein the water soluble divalent salt is selected from the group consisting of zinc (II) acetate, zinc (II) bromide, zinc (II) chlorate, zinc (II) chloride, zinc (II) fluoride, zinc (II) formate, zinc (II) iodide, zinc (II) nitrate, zinc (II) sulfate monohydrate, zinc (II) sulfate heptahydrate, zinc (II) sulfate hexahydrate, zinc (II) sulfate anhydrous, and mixtures thereof.

48. The method of claim 36, wherein the foam control agent is selected from the group consisting of alkyl polyacrylates, fatty acids, fatty alcohols, monoglycerides, diglycerides, triglycerides, a silicone-based foam control agent, and mixtures thereof.

49. The method of claim 36, wherein the metal ion complexing agent is selected from the group consisting of diethylenetriaminepentaacetic acid, ethylenedinitrilotetraacetic acid, nitrilotriacetic acid, diethanolamine, triethanolamine, and mixtures thereof.

50. The method of claim 36, wherein the film forming agent is polyvinyl alcohol.

51. The harvested plant part made by the method of claim 36.

52. The method of claim 36, wherein said method further comprises:
applying a plant treatment chemical to the harvested plant part.

53. The method of claim 52, wherein the plant treatment chemical is a pesticide.

54. The method of claim 53, wherein the pesticide is selected from the group consisting of an insecticide, a fungicide, a miticide, and a nematicide.

55. The method of claim 54, wherein the plant treatment chemical is an insecticide selected from the group consisting of carbamates, organochlorines, nicotinoids, phosphoramidothioates, organophosphates, pyrethroids and combinations thereof.

56. The method of claim 54, wherein the plant treatment chemical is a fungicide selected from the group consisting of aliphatic nitrogens, benzimidazoles, dicarboximides, dithiocarbamates, imidazoles, strobins, anilides, aromatics, sulfur derivatives, copper derivatives, and combinations thereof.

57. The method of claim 54, wherein the plant treatment chemical is a miticide selected from the group consisting of carbamates, carbazates, diphenyl oxazolines, glycides, macrocylic compounds, METI-acaracides, napthoquinone derivatives, organochlorines, organophosphates, organotins, oils, pyrethroids, pyridazinone, pyrroles, soaps, sulfur, tetrazines, tetronic acids, and combinations thereof.

58. The method of claim 54, wherein the plant treatment chemical is a nematicide selected from the group consisting of carbamates, organophosphates, halogenated hydrocarbons, methyl isothiocyanate liberators, and combinations thereof.

59. The harvested plant part made by the method of claim 52.

60. The method of claim 36, wherein said method is carried out to minimize water loss in the harvested plant part.

61. The method of claim 36, wherein said method is carried out to extend post-harvest shelf life of the harvested plant part.

* * * * *

UNITED STATES PATENT AND TRADEMARK OFFICE
CERTIFICATE OF CORRECTION

PATENT NO. : 11,666,048 B2
APPLICATION NO. : 16/480250
DATED : June 6, 2023
INVENTOR(S) : James Holt Lefiles and Bill Davis It is certified that error appears in the above-identified patent and that said Letters Patent is hereby corrected as shown below:

In the Claims

In Claim 33, Column 27, Line 38 delete "Botryotinia fucehana" and insert --Botryotinia fuckehana--

Signed and Sealed this
Eighth Day of August, 2023

Katherine Kelly Vidal
*Director of the United States Patent and Trademark Office*